US008837450B2

(12) United States Patent
Papasakellariou et al.

(10) Patent No.: US 8,837,450 B2
(45) Date of Patent: Sep. 16, 2014

(54) TRANSMISSION OF HARQ CONTROL INFORMATION FROM A USER EQUIPMENT FOR DOWNLINK CARRIER AGGREGATION

(75) Inventors: Aris Papasakellariou, Houston, TX (US); Young-Bum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 325 days.

(21) Appl. No.: 13/205,741

(22) Filed: Aug. 9, 2011

(65) Prior Publication Data

US 2012/0034927 A1 Feb. 9, 2012

Related U.S. Application Data

(60) Provisional application No. 61/371,861, filed on Aug. 9, 2010.

(51) Int. Cl.
H04B 7/216 (2006.01)
H04W 52/32 (2009.01)
H04W 52/14 (2009.01)
H04B 7/26 (2006.01)
H04L 1/18 (2006.01)
H04W 72/04 (2009.01)

(52) U.S. Cl.
CPC .......... H04W 52/32 (2013.01); H04B 7/2628 (2013.01); H04L 1/1812 (2013.01); H04L 1/1861 (2013.01); H04W 52/146 (2013.01); H04W 72/042 (2013.01)
USPC ........................................ 370/342

(58) Field of Classification Search
CPC .................................. H04B 7/2628
USPC ........................................ 370/342
See application file for complete search history.

(56) References Cited

U.S. PATENT DOCUMENTS

2010/0272048 A1* 10/2010 Pan et al. ............ 370/329
2011/0286391 A1* 11/2011 Chen et al. ........... 370/328
2011/0317778 A1* 12/2011 Hooli et al. .......... 375/260
2013/0230000 A1* 9/2013 Wang et al. .......... 370/329

OTHER PUBLICATIONS

Ericsson et al.: "PUCCH Design for Carrier Aggregation", R1-102611, 3GPP TSG-RAN WG1 #61, May 4, 2010.
Samsung: "PUCHH Format 3 Transmission Power for DL CA", R1-106020, 3GPP TSG RAN WG1 #63, Nov. 9, 2010.
Motorola: "Introduction of Rel-10 LTE-Advanced Features in 36.213", R1-105098, 3GPP TSG-RAN Meeting #62, Sep. 14, 2010.
3rd Generation Partnership Project; Technical Specification Group Radio Access Network; Evolved Universal Terrestrial Radio Access (E-UTRA); Physical Later Procedures (Release 9), 3GPP TS 36.213 V9.2.0, Jun. 10, 2010.

(Continued)

Primary Examiner — Mark Rinehart
Assistant Examiner — Christopher R Crompton
(74) Attorney, Agent, or Firm — The Farrell Law Firm, P.C.

(57) ABSTRACT

Methods and apparatus are described for a User Equipment (UE) to transmit acknowledgement information together with data information in a Physical Uplink Shared CHannel (PUSCH) or separate from data information in a Physical Uplink Control CHannel (PUCCH). The HARQ-ACK payload for transmission in a PUSCH and the HARQ-ACK signal transmission power for transmission in a PUCCH are derived based on the existence and design of a Downlink Assignment Index (DAI) Information Element (IE) in the Downlink Control Information (DCI) formats scheduling receptions of data Transport Blocks (TBs) by the UE.

20 Claims, 17 Drawing Sheets

(56) References Cited

OTHER PUBLICATIONS

Ericsson et al.: "On ACK/NACK Codebook Performance for Carrier Aggregation", R1-102613, 3GPP TSG-RAN WG1 #61, May 4, 2010.
Nokia et al.: "UL ACK/NAK Feedback for Power-Limited UE in LTE-A TDD", R1-103788, 3GPP TSG RAN WG1 Meeting #61bis, Jun. 28, 2010.
ZTE: "ACK/NACK Design for LTE-Advanced", R1-101398, 3GPP TSG-RAN WG1 Meeting #60, Feb. 22, 2010.
Samsung: "DAI Design for LTE-A TDD", R1-101143, 3GPP TSG RAN WG1 Meeting #60, Feb. 22, 2010.
Catt: "UL ACK/NACK Transmission Design in FDD with CA", 3GPP TSG RAN WG1 Meeting #60, Feb. 22, 2010.
Catt: "DAI Design for LTE-A", 3GPP TSG RAN WG1 Meeting #61bis, Jun. 28, 2010.
Samsung: "UL DAI for DL CA", 3GPP TSG RAN WG1 #64, Feb. 21, 2011.
Samsung: "HARQ-ACK Codebook Size in PUSCH", 3GPP TSG RAN WG1 #65, May 9, 2011.
Samsung: "Need for DAI and HARQ-ACK Transmission Aspects with CA", 3GPP TSG RAN WG1 #62, Aug. 23, 2010.
Huawei: "A/N Transmission in TDD CA", 3GPP TSG RAN WG1 Meeting #61bis, Jun. 28, 2010.

* cited by examiner

US 8,837,450 B2

TRANSMISSION OF HARQ CONTROL INFORMATION FROM A USER EQUIPMENT FOR DOWNLINK CARRIER AGGREGATION

PRIORITY

The present application claims priority under 35 U.S.C. §119(e) to U.S. Provisional Application No. 61/371,861, which was filed in the United States Patent and Trademark Office on Aug. 9, 2010, the entire content of which is incorporated herein by reference.

BACKGROUND OF THE INVENTION

1. Field of the Invention

The present invention is directed generally to wireless communication systems and, more specifically, to the transmission of acknowledgement information in an uplink of a communication system.

2. Description of the Art

A communication system includes a DownLink (DL) that conveys transmission signals from a Base Station (BS or NodeB) to User Equipments (UEs) and an UpLink (UL) that conveys transmission signals from UEs to the NodeB. A UE, also commonly referred to as a terminal or a mobile station, may be fixed or mobile and may be a wireless device, a cellular phone, a personal computer device, etc. A NodeB is generally a fixed station and may also be referred to as a Base Transceiver System (BTS), an access point, or some other equivalent terminology.

More specifically, the UL conveys data signals carrying information content, control signals providing control information associated with the transmission of data signals on the DL, and Reference Signals (RSs), e.g., pilot signals. The DL also conveys data signals, control signals, and RSs.

UL data signals are conveyed through a Physical Uplink Shared CHannel (PUSCH) and DL data signals are conveyed through a Physical Downlink Shared CHannel (PDSCH).

In the absence of a PUSCH transmission, a UE conveys UL Control Information (UCI) through a Physical Uplink Control CHannel (PUCCH). However, when it has a PUSCH transmission, a UE may convey UCI and data through the PUSCH.

DL control signals may be broadcast or sent in a UE-specific nature. Accordingly, UE-specific control channels can be used, among other purposes, to provide UEs with Scheduling Assignments (SAs) for PDSCH reception, i.e., DL SAs, or PUSCH transmission, i.e., UL SAs. The SAs are transmitted from the NodeB to respective UEs using DL Control Information (DCI) formats through respective Physical DL Control CHannels (PDCCHs).

The NodeB may configure a UE through higher layer signaling, such as Radio Resource Control (RRC) signaling, a PDSCH Transmission Mode (TM), and a PUSCH TM. The PDSCH TM or PUSCH TM is respectively associated with a DL SA or a UL SA and defines whether the respective PDSCH or PUSCH conveys one data Transport Block (TB) or two data TBs.

PDSCH or PUSCH transmissions are either scheduled to a UE by the NodeB through higher layer signaling, such as Radio Resource Control (RRC) signaling, or through physical layer signaling, e.g., a PDCCH, using a respective DL SA or UL SA, or correspond to non-adaptive retransmissions for a given Hybrid Automatic Repeat reQuest (HARQ) process. Scheduling by RRC signaling is semi-static and is referred to as Semi-Persistent Scheduling (SPS). Scheduling by PDCCH is referred to as dynamic. If a UE misses, e.g., fails to decode, a PDCCH, it also misses the associated PDSCH or PUSCH, respectively. This event will be referred to as Discontinuous Transmission (DTX).

The UCI includes ACKnowledgment (ACK) information associated with a HARQ process (HARQ-ACK). The HARQ-ACK information may include multiple bits corresponding to positive acknowledgments (ACKs) for TBs the UE correctly received or negative acknowledgements (NACKs) for TBs the UE incorrectly received. When a UE does not receive a TB, it may transmit DTX (tri-state HARQ-ACK information) or both the absence and the incorrect reception of a TB can be represented by a NACK (in a combined NACK/DTX state). One consequence of a UE not providing DTX information to the NodeB is that the NodeB cannot use Incremental Redundancy (IR) for the HARQ process. This leads to throughput loss. Another consequence is that PDCCH power control, based on DTX feedback, is not possible.

FIG. 1 illustrates a conventional PUSCH transmission structure.

Referring to FIG. 1, a Transmission Time Interval (TTI) is one subframe 110, which includes two slots. Each slot 120 includes $N_{symb}^{UL}$ symbols, which are used to transmit data signals, UCI signals, or RSs. Each symbol 130 includes a Cyclic Prefix (CP) to mitigate interference due to channel propagation effects. The transmission in one slot may be either at a same or at a different BandWidth (BW) than the transmission in the other slot. Some PUSCH symbols in each slot are used to transmit an RS 140, which enables channel estimation and coherent demodulation of the received data and/or UCI signals.

The transmission BW includes frequency resource units that will be referred to herein as Physical Resource Blocks (PRBs). Each PRB includes $N_{sc}^{RB}$ sub-carriers, or Resource Elements (REs), and a UE is allocated $M_{PUSCH}$ PRBs 150 for a total of $M_{sc}^{PUSCH} = M_{PUSCH} \cdot N_{sc}^{RB}$ for the PUSCH transmission BW.

The last subframe symbol may be used for transmitting a Sounding RS (SRS) 160 from one or more UEs. The SRS provides, to the NodeB, an estimate of the channel medium the respective UE experiences over the SRS transmission BW. The SRS transmission parameters are configured to each UE, by the NodeB, through higher layer signaling.

In FIG. 1, the number of subframe symbols available for transmission of data or UCI signals is $N_{symb}^{PUSCH} = 2 \cdot (N_{symb}^{UL} - 1) - N_{SRS}$, N where $N_{SRS} = 1$ if the last subframe symbol is used for SRS transmission and $N_{SRS} = 0$ otherwise.

FIG. 2 illustrates a conventional transmitter for transmitting data information and HARQ-ACK information in a PUSCH.

Referring to FIG. 2, encoded HARQ-ACK bits 210 and encoded data bits 220 formed into a signal stream by puncturer/inserter 230. Discrete Fourier Transform (DFT) is then performed by DFT unit 240. The REs for the PUSCH transmission BW are selected by the sub-carrier mapping unit 250 as instructed from controller 255. Inverse Fast Fourier Transform (IFFT) is performed by an IFFT unit 260, CP insertion is performed by a CP insertion unit 270, and time windowing is performed by filter 280, thereby generating a transmitted signal 290. For brevity, the encoding and modulation processes and additional transmitter circuitry such as digital-to-analog converter, analog filters, amplifiers, and transmitter antennas are not illustrated.

The PUSCH transmission is assumed to be over a single cluster 295A or over multiple clusters 295B of contiguous REs in accordance to the DFT Spread Orthogonal Frequency Division Multiple Access (DFT-S-OFDMA) method for signal transmission.

FIG. 3 illustrates a conventional receiver for receiving a transmission signal as illustrated in FIG. 2.

Referring to FIG. 3, an antenna receives a Radio-Frequency (RF) analog signal and after further processing, e.g., such filtering, amplification, and analog-to-digital converting, the received digital signal 310 is filtered by filter 320 and the CP is removed by CP removal unit 330. Subsequently, the receiver unit applies a Fast Fourier Transform (FFT) by an FFT unit 340, and selects the REs used by the transmitter by sub-carrier demapping by a sub-carrier demapping unit 350 under a control of controller 355. Thereafter, an Inverse DFT (IDFT) unit 360 applies IDFT, and an extraction unit 370 extracts the HARQ-ACK bits, places erasures at the respective REs for the data bits 380, and finally obtains the data bits 390.

The RS transmission is assumed to be through a Constant Amplitude Zero Auto-Correlation (CAZAC) sequence. Orthogonal multiplexing of CAZAC sequences can be achieved by applying different Cyclic Shifts (CSs) to the same CAZAC sequence.

Assuming, for simplicity, that the PUSCH conveys a single data TB, for HARQ-ACK transmission in a PUSCH, a UE determines a respective number of encoded HARQ-ACK symbols Q' using Equation (1).

$$Q' = \min\left(\left\lceil \frac{O_{HARQ\text{-}ACK} \cdot \beta_{offset}^{HARQ\text{-}ACK}}{Q_m \cdot R} \right\rceil, 4 \cdot M_{sc}^{PUSCH}\right) \quad (1)$$

In Equation (1), $O_{HARQ\text{-}ACK}$ is a number of HARQ-ACK information bits (HARQ-ACK payload), $\beta_{offset}^{HARQ\text{-}ACK}$ is a parameter the NodeB informs to the UE through higher layer signaling, $Q_m$ is a number of data information bits per modulation symbol ($Q_m$=2, 4, 6 for QPSK, QAM16, QAM64, respectively), R is a data code rate of an initial PUSCH transmission for the same TB, $M_{sc}^{PUSCH}$ is a PUSCH transmission BW in a current subframe, and $\lceil \ \rceil$ is the ceiling function that rounds a number to its next integer.

The data code rate R is defined as shown in Equation (2).

$$R = \left(\sum_{r=0}^{CH-1} K_r\right) / \left(Q_m \cdot M_{sc}^{PUSCH\text{-}initial} \cdot N_{symb}^{PUSCH\text{-}initial}\right) \quad (2)$$

In Equation (2), CB is a total number of data code blocks and $K_r$ is a number of bits for data code block number r.

The maximum number of encoded HARQ-ACK symbols is limited to the number of REs in 4 DFT-S-OFDM symbols ($4 \cdot M_{sc}^{PUSCH}$), which may be located in the two DFT-S-OFDM symbols adjacent to the RS in each of the two subframe slots, as illustrated in FIG. 1.

The determination of the number of encoded HARQ-ACK symbols when a PUSCH conveys multiple TBs, using for example the Single-User Multiple Input Multiple Output (SU-MIMO) transmission method, is similar to when a PUSCH conveys one TB. Accordingly, a repetitive description is omitted for brevity, as it is not material to the present invention.

If a PDSCH conveys one TB, the respective HARQ-ACK information includes one bit, which is encoded as a binary '1', if the TB is correctly received (ACK value), and as a binary '0', if the TB is incorrectly received (NACK value). If a PDSCH conveys two TBs, the HARQ-ACK information includes two bits $[o_0^{ACK} \ o_1^{ACK}]$ with $o_0^{ACK}$ for TB 0 and $o_1^{ACK}$ for TB 1. The transmission of one HARQ-ACK bit may use repetition coding and the transmission of two HARQ-ACK bits may use a (3, 2) simplex code.

A PDSCH with multiple TBs (e.g., two TBs) can be supported using SU-MIMO transmission with a rank greater than 1. In response to a PDSCH reception with multiple TBs, a UE generates multiple respective HARQ-ACK information bits. However, it is possible for a UE to always generate only one HARQ-ACK bit per PDSCH reception by applying HARQ-ACK spatial-domain bundling. With spatial-domain bundling, the HARQ-ACK bit has the NACK value when at least one TB is incorrectly received and has the ACK value when all TBs are correctly received.

For a Time Division Duplex (TDD) communication system, a PDSCH in several DL subframes may be received before a UL subframe is available for HARQ-ACK transmission, either in a PUSCH or in a PUCCH. Then, a UE may need to transmit multiple HARQ-ACK information bits in a single UL subframe. For HARQ-ACK payload $O_{HARQ\text{-}ACK}$>2 bits, a linear block code, such as the (32, $O_{HARQ\text{-}ACK}$) Reed-Mueller code, may be used.

The fundamental conditions for the proper HARQ-ACK transmission in a PUSCH are for the UE and the NodeB to have the same understanding (1) of whether HARQ-ACK information is included in the PUSCH, (2) of the corresponding HARQ-ACK payload, and (3) of how the HARQ-ACK information bits are multiplexed in the PDSCH.

For a Frequency Division Duplex (FDD) communication system and single-cell operation, no specific measures are necessary to ensure the above common understanding, as the communication is over a single cell and the HARQ-ACK information is for a single PDSCH.

In TDD, due to the additional time dimension relative to FDD, a DL Assignment Index (DAI) Information Element (IE), $V_{DAI}^{UL}$, may be included in UL SAs to inform a UE of the HARQ-ACK payload, if any, to convey in a PUSCH (UL DAI). A DAI IE is also included in DL SAs, $V_{DAI}^{DL}$, for a UE to determine whether it has missed any DL SA, except for the last DL SA, when the UE transmits HARQ-ACK in the PUCCH (DL DAI). As the NodeB cannot predict whether a given UE will have DL SAs in future DL subframes, the $V_{DAI}^{DL}$ is a relative counter that is incremented in each DL SA transmitted to a given UE and starts from the beginning after the last DL subframe linked to the UL subframe of the HARQ-ACK signal transmission.

FIG. 4 illustrates a conventional PUCCH structure in one subframe slot for a UE to transmit multi-bit HARQ-ACK information based on a DFT-S-OFDM transmission method.

Referring to FIG. 4, after encoding and modulation using, for example, an RM block code and QPSK, respectively, a set of the same HARQ-ACK bits 410 is multiplied 420 with elements of an Orthogonal Covering Code (OCC) 430 and is subsequently DFT precoded 440. For example, for 5 symbols per slot carrying HARQ-ACK bits, the OCC has length 5 {OCC(0), OCC(1), OCC(2), OCC(3), OCC(4)} and can be either of (1, 1, 1, 1, 1), or {1, exp(j2 π/5), exp(j4 π/5), exp(j6 π/5), exp(j8 π/5)}, or {1, exp(j4 π/5), exp(j8 π/5), exp(j2 π/5), exp(j6 π/5)}, or {1, exp(j6 π/5), exp(j2 π/5), exp(j8 π/5), exp(j4 π/5)}, or {1, exp(j8 π/5), exp(j6 π/5), exp(j4 π/5), exp(j2 π/5). The output is passed through an IFFT 450 and it is then mapped to a DFT-S-OFDM symbol 460.

As the previous operations are linear, their relative order may be inter-changed. Because the PUCCH transmission is in 1 PRB, which include $N_{sc}^{RB}$=12 REs, 24 encoded HARQ- ACK bits are transmitted in each slot with QPSK modulation (12 HARQ-ACK QPSK symbols). The same or different HARQ-ACK bits may be transmitted in the second slot of the subframe. In addition to HARQ-ACK signals, RSs are transmitted in each slot to enable coherent demodulation of the HARQ-ACK signals. The RS is constructed from a length-12 CAZAC sequence 470, which passes through an IFFT 480, and is mapped to another DFT-S-OFDM symbol 490.

FIG. 5 illustrates a conventional UE transmitter for HARQ-ACK signals in a PUCCH.

Referring to FIG. 5, the HARQ-ACK information bits 505 are encoded and modulated by an encoder and modulator 510 and then multiplied with an element of the OCC 525 for the respective DFT-S-OFDM symbol by multiplier 520. The output of the multiplier 520 is then precoded by DFT precoder 530. After DFT precoding, sub-carrier mapping is performed by sub-carrier mapper 540, under control of controller 550. Thereafter, the IFFT is performed by IFFT 560, a CP is added by CP inserter 570, and the signal is filtered by filter 580, thereby generating the transmitted signal 590. For brevity, additional transmitter circuitry such as digital-to-analog converter, analog filters, amplifiers, and transmitter antennas are not illustrated in FIG. 5.

FIG. 6 illustrates a conventional NodeB receiver for HARQ-ACK signals in a PUCCH.

Referring to FIG. 6, after receiving an RF analog signal and converting the analog signal to a digital signal 610, the digital signal 610 is filtered by filter 620 and a CP is removed by CP remover 630. Subsequently, the NodeB receiver applies a Fast Fourier Transform (FFT) by FFT 640, performs sub-carrier demapping by sub-carrier demapper 650 under the control of controller 655, and applies an Inverse DFT (IDFT) by IDFT 660. The output of the IDFT 660 is then multiplied with an OCC element 675 for the respective DFT-S-OFDM symbol by multiplier 670. An adder 680 sums the outputs for the DFT-S-OFDM symbols conveying HARQ-ACK signals over each slot, and a demodulator and decoder 690 demodulates and decodes the summed HARQ-ACK signals over both subframe slots to obtain the transmitted HARQ-ACK information bits 695.

The HARQ-ACK signal transmission power in a PUCCH in subframe i, $P_{PUCCH}(i)$, is assumed to be given as shown in Equation (3).

$$P_{PUCCH}(i) = \min\{P_{CMAX}, h(O_{HARQ-ACK}) + Q(i)\} \quad (3)$$

In Equation (3), the measure is decibels (dBs) per milliwatt (dBm), $P_{CMAX}$ is the maximum transmission power configured to the UE, Q(i) contains cell-specific and UE-specific parameters, which are not material to the present invention, and $h(O_{HARQ-ACK})$ is a monotonically increasing function of the HARQ-ACK payload $O_{HARQ-ACK}$. The derivation of $P_{PUCCH}(i)$ in Equation (3) does not account for possible puncturing of DFT-S-OFDM symbols in a PUCCH, such as, for example, the last symbol to accommodate SRS transmissions, or for possible multiplexing of additional information other than HARQ-ACK in a PUCCH.

For HARQ-ACK transmission in a PUSCH, as the PUSCH transmission power is determined assuming data transmission and as the transmission powers of HARQ-ACK REs and data REs are the same, the HARQ-ACK reception reliability depends on the number of respective REs as reflected in Equation (1). For HARQ-ACK transmission in a PUCCH, the number of REs is predetermined (12 REs over one UL subframe) and the HARQ-ACK reception reliability depends on the transmission power of the HARQ-ACK signal.

In order to increase peak data rates, the NodeB can configure a UE with Carrier Aggregation (CA) of multiple cells to provide higher operating BWs. For example, to support communication over 60 MHz to a UE, CA of three 20 MHz cells can be used. Assuming that the PDSCH in each cell conveys different TBs, the UE generates separate HARQ-ACK information for the respective TBs received in each cell. This is similar to single-cell TDD operation, where the UE generates separate HARQ-ACK information for the respective TBs received in each DL subframe for which the HARQ-ACK transmission is in the same UL subframe.

Unlike the DL SAs in different subframes of a TDD system, for DL CA, the NodeB knows the total number of PDSCH or DL SAs it transmits to a UE in a given subframe. A cell-domain DL DAI IE can then be introduced in DL SAs which, unlike the time-domain DL DAI IE in a TDD system that is a relative counter for the respective DL SA, can be an absolute counter conveying the total number of DL SAs in a given subframe.

A UE is configured with c cells for DL CA. In $C_2 \leq C$ cells, the UE is configured with a PDSCH TM that supports 2 TBs and requires 2 HARQ-ACK information bits. In the remaining $C-C_2$ cells, the UE is configured with a PDSCH TM that supports 1 TB and requires 1 HARQ-ACK information bit. In a given subframe, $P \leq C$ PDSCH are transmitted to a UE, with $P_2 \leq P$ PDSCH requiring feedback of 2 HARQ-ACK information bits and $P-P_2$ PDSCH requiring feedback of 1 HARQ-ACK information bit for a total of $N_{TB}^{transmitted} = P + P_2$ transmitted TBs and a total of $P+P_2$ HARQ-ACK bits. The UE receives $R \leq P$ PDSCH with $R_2 \leq P_2$ PDSCH requiring feedback of 2 HARQ-ACK information bits and $R-R_2$ PDSCH requiring feedback of 1 HARQ-ACK information bit for a total of $N_{TB}^{received} = R + R_2$ received TBs and a total of $R+R_2$ HARQ-ACK bits. Dynamic switching in a cell between a TM requiring 2 HARQ-ACK information bits and a TM requiring 1 HARQ-ACK information bit is supported.

FIG. 7 illustrates a set of cells configured to a UE, a subset of configured cells with PDSCH transmission in a given subframe from a NodeB to the UE, and a further subset of cells wherein the PDSCH transmission from the NodeB is received by the UE.

Referring to FIG. 7, a UE is configured with C=4 cells, 710, 712, 714, and 716. The PDSCH in $C_2$=2 cells, 710 and 716, conveys 2 TBs. The NodeB transmits DL SAs (and the associated PDSCHs, if any) in P=3 cells, 720, 722, and 726. The NodeB does not transmit DL SA in C−P=1 cell 724. The UE receives DL SAs in R=2 cells, 730 and 732, it does not receive DL SA in one cell 734, and misses the DL SA (and the associated PDSCH, if any) in one cell 736.

For HARQ-ACK transmission in a PUCCH and absence of cell-domain DL DAI IE, because a UE may miss some DL SAs, a common understanding for the HARQ-ACK payload between the UE and the NodeB can be achieved only if the HARQ-ACK payload is always the maximum one of $O_{HARQ-ACK} = C + C_2$ bits (or, with spatial-domain bundling, $O_{HARQ-ACK} = C$ bits). Using the maximum HARQ-ACK payload of $O_{HARQ-ACK} = C + C_2$ bits does not create additional resource overhead. The UE may transmit a NACK or a DTX (in case of tri-state HARQ-ACK information) for the $C+C_2-R-R_2$ TBs it did not receive, but the NodeB already knows the cells with no DL SA or PDSCH transmission to the UE and can use the knowledge that the UE transmits a NACK for each of those TBs (a-priori information) to improve the reception reliability of the HARQ-ACK CW. Then, even though the HARQ-ACK payload is $O_{HARQ-ACK} = C + C_2$ bits, the reception reliability of the HARQ-ACK CW is practically the one obtained if the HARQ-ACK payload was $P+P_2$ bits (or, with spatial-domain bundling, P bits).

The NodeB is able to use a-priori information to improve the decoding reliability of the HARQ-ACK CW because a linear block code and QPSK are assumed to be used for the encoding and modulation of the HARQ-ACK bits, respectively. Simply, the NodeB considers only HARQ-ACK CWs having NACK (binary '0') at the predetermined locations as candidates. Due to the implementation of the decoding process, the use of the a-priori information would be impractical or impossible if a convolutional code or a turbo code was used for the encoding or if QAM was used for the modulation of the HARQ-ACK bits.

Although HARQ-ACK signal transmission in a PUCCH with the maximum payload of $O_{HARQ-ACK} = C+C_2$ bits (or, with spatial-domain bundling, of $O_{HARQ-ACK} = C$ bits) does not generate additional resource overhead, it may use larger HARQ-ACK signal transmission power than that needed to achieve the desired reception reliability because the HARQ-ACK payload in the PUCCH is larger than or equal to the actual one of $P+P_2$ bits (or, with spatial-domain bundling, of P bits).

Transmission with larger power than necessary increases UE power consumption and creates additional interference, thereby degrading the reception reliability of signals transmitted in the same BW in other cells.

For HARQ-ACK transmission in a PUSCH, using the maximum HARQ-ACK payload creates unnecessary resource overhead when the actual HARQ-ACK payload is smaller than the maximum one. HARQ-ACK transmission is assumed to be in a single PUSCH, which may be determined, for example, based on a predetermined prioritization for the configured cells.

Therefore, there is a need for deriving the HARQ-ACK payload for transmission in the PUSCH and reducing the corresponding overhead for DL CA.

There is another need for deriving the HARQ-ACK signal transmission power in the PUCCH, while both achieving the desired reception reliability for the HARQ-ACK CW and minimizing interference and UE power consumption for DL CA.

There is another need for setting the appropriate HARQ-ACK transmission power in the PUCCH, while considering the existence of SRS transmission and the multiplexing of other information in the same PUCCH transmission.

There is another need for designing a cell-domain DL DAI IE in the DL SAs and a cell-domain UL DAI IE in the UL SAs, such that the overhead for HARQ-ACK transmission in the PUSCH is minimized, while achieving proper functionality.

SUMMARY OF THE INVENTION

Accordingly, the present invention has been designed to address at least some of the aforementioned limitations and problems occurring in the prior art and the present invention provides at least the advantages as described below.

An aspect of the present invention is to provide methods and apparatuses for a UE to determine the HARQ-ACK payload for transmission in a PUSCH and the HARQ-ACK signal transmission power for transmission in a PUCCH while considering the existence and design of a DAI IE in DCI formats scheduling PDSCH receptions by the UE, the existence and design of a DAI IE in DCI formats scheduling PUSCH transmissions by the UE, and the transmission of other information or signals, by the UE, during a TTI the UE transmits an HARQ-ACK signal in a PUCCH.

In accordance with an aspect of the present invention, a method for a User Equipment (UE) to transmit acknowledgement information and data information in a Physical Uplink Shared CHannel (PUSCH) is provided. The method includes receiving, by the UE, a first Downlink Control Information (DCI) format transmitted by a base station in a first Physical Downlink Control CHannel (PDCCH), wherein the first DCI format includes a Downlink Assignment Index (DAI) Information Element (IE) indicating whether the UE should transmit the acknowledgement information with the data information in the PUSCH, when the UE is configured to communicate over multiple downlink cells, and omits the DAI IE from the first DCI format, when the UE is configured communicate over a single downlink cell; transmitting the data information with the acknowledgement information in the PUSCH, when indicated by the DAI IE and the UE does not receive a Physical Downlink Shared CHannels (PDSCH) from the base station; and transmitting the data information without the acknowledgement information in the PUSCH, when the UE does not receive the PDSCH from the base station and the DAI IE is omitted from the DCI format In accordance with another aspect of the present invention, a method for a User Equipment (UE) to determine a transmission power for an acknowledgement signal in a Physical Uplink Control CHannel (PUCCH) is provided. The UE is configured, by a base station, with C cells in a downlink of a communication system, is configured with a first transmission mode conveying a maximum of two data Transport Blocks (TBs) in each of $C_2$ configured cells during a Transmission Time Interval (TTI), where $C_2$ is less than or equal to C, and is configured with a second transmission mode conveying one data TB in each of $C-C_2$ configured cells during a TTI. The method includes receiving a total of $N_{TB}^{received}$ data TBs over the C cells during a first TTI; generating an acknowledgement bit for each of the $N_{TB}^{received}$ received data TBs and for each of the $C+C_2-N_{TB}^{received}$ not received data TBs in the first TTI, each acknowledgement bit indicating one of (1) a correct reception and (2) an incorrect or absent reception of each respective data TB; generating an acknowledgement signal conveying $C+C_2$ acknowledgement bits; and transmitting the acknowledgement signal with a transmission power derived from the value of $N_{TB}^{received}$.

In accordance with another aspect of the present invention, a User Equipment (UE) apparatus is provided for transmitting an acknowledgement signal in a Physical Uplink Control CHannel (PUCCH). The UE apparatus is configured, by a base station, with C cells in a downlink of a communication system, is configured with a first transmission mode conveying a maximum of two data Transport Blocks (TBs) in each of $C_2$ configured cells during a Transmission Time Interval (TTI), where $C_2$ is smaller than or equal to C, and is configured with a second transmission mode conveying one data TB in each of $C-C_2$ configured cells during a TTI. The apparatus includes a receiver for receiving a total of $N_{TB}^{received}$ data TBs over the C cells during a first TTI; a generator for generating an acknowledgement bit for each of the $N_{TB}^{received}$ received data TBs and for each of $C+C_2-N_{TB}^{received}$ not received data TBs in the first TTI, wherein each acknowledgement bit indicates one of (1) a correct reception and (2) an incorrect or absent reception of each respective data TB; and a transmitter for transmitting an acknowledgement signal including $C+C_2$ acknowledgement bits with a transmission power derived from a value of $N_{TB}^{received}$.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
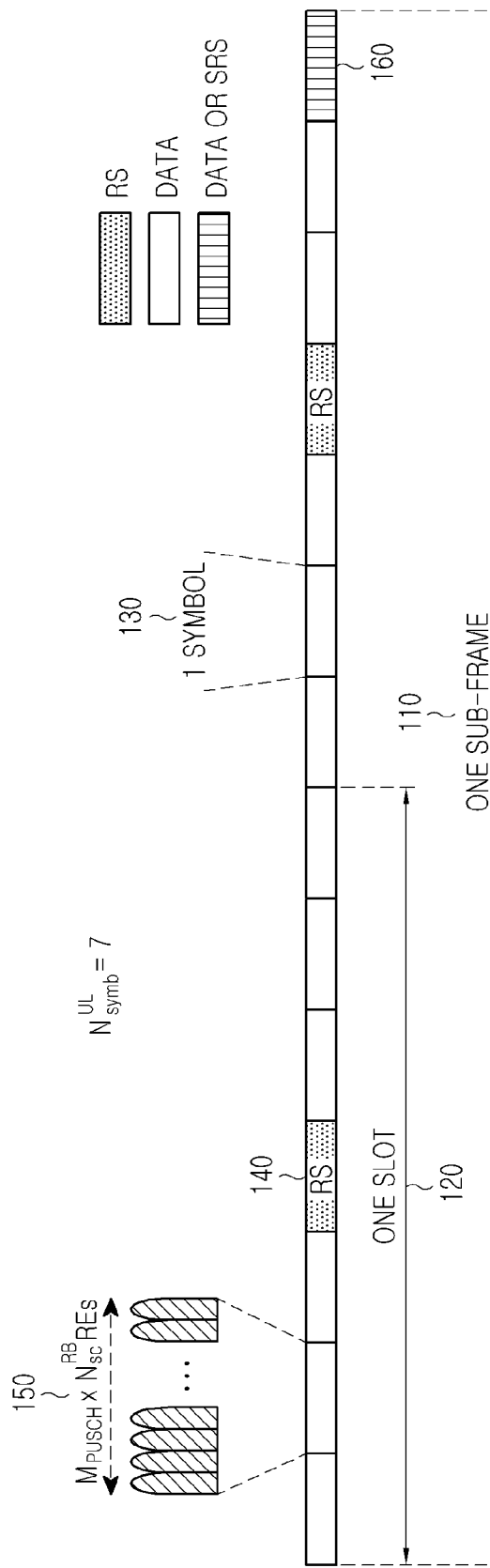
FIG. 1 is a diagram illustrating a conventional PUSCH subframe structure.
Figure 2:
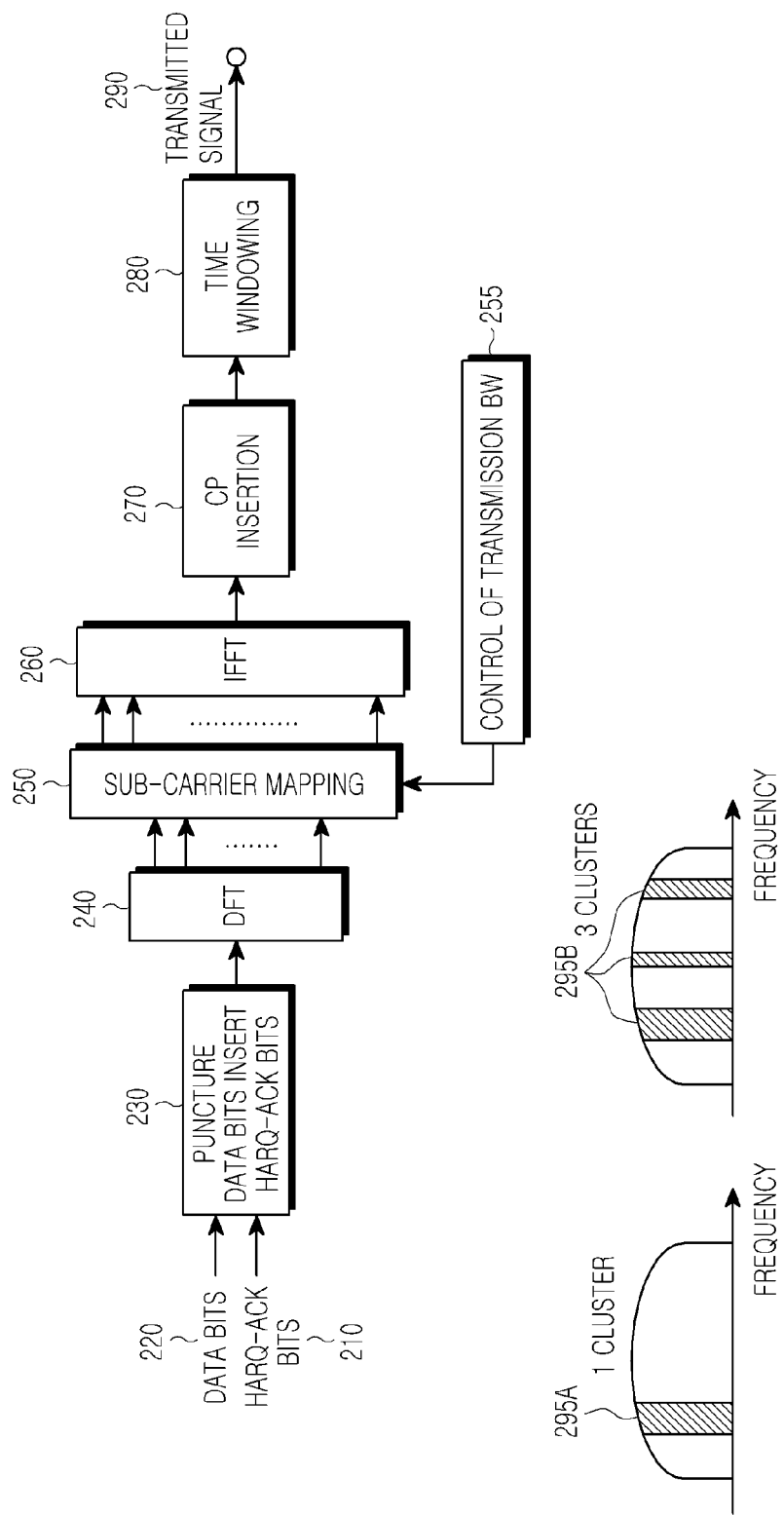
FIG. 2 is a block diagram illustrating a conventional transmitter for transmitting data information and HARQ-ACK information in a PUSCH.
Figure 3:
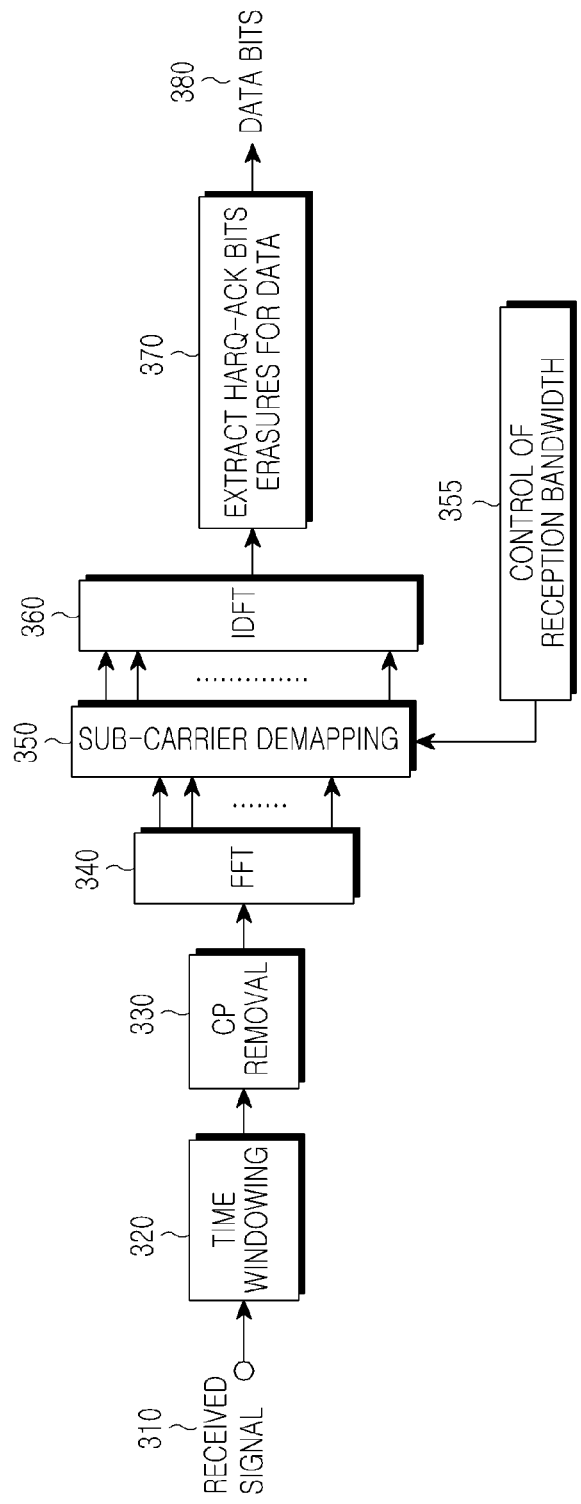
FIG. 3 is a block diagram illustrating a conventional receiver for receiving data information and HARQ-ACK information in the PUSCH.
Figure 4:
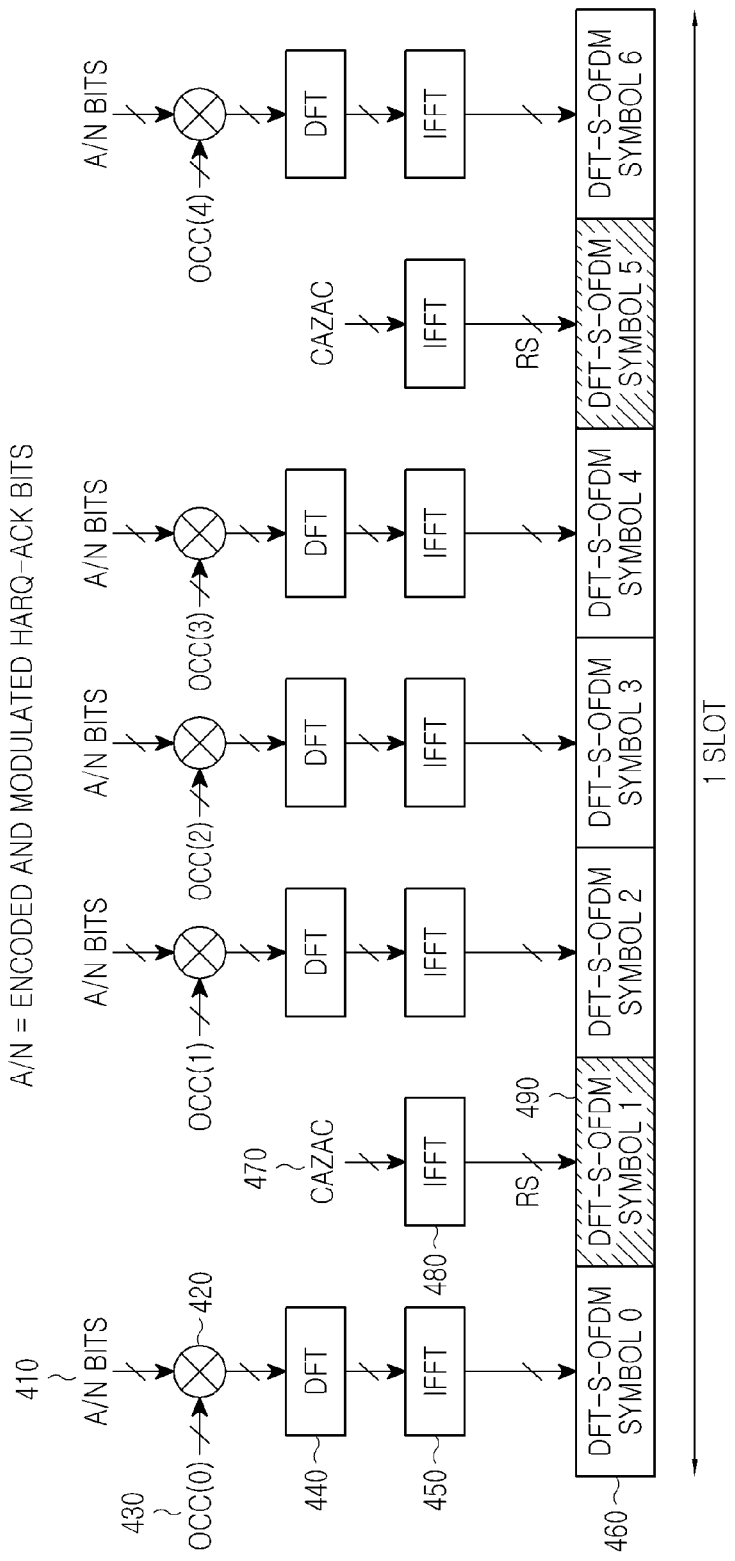
FIG. 4 is a block diagram illustrating a conventional PUCCH structure in one subframe slot for transmission of multi-bit HARQ-ACK information based on the DFT-S-OFDM transmission method.
Figure 5:
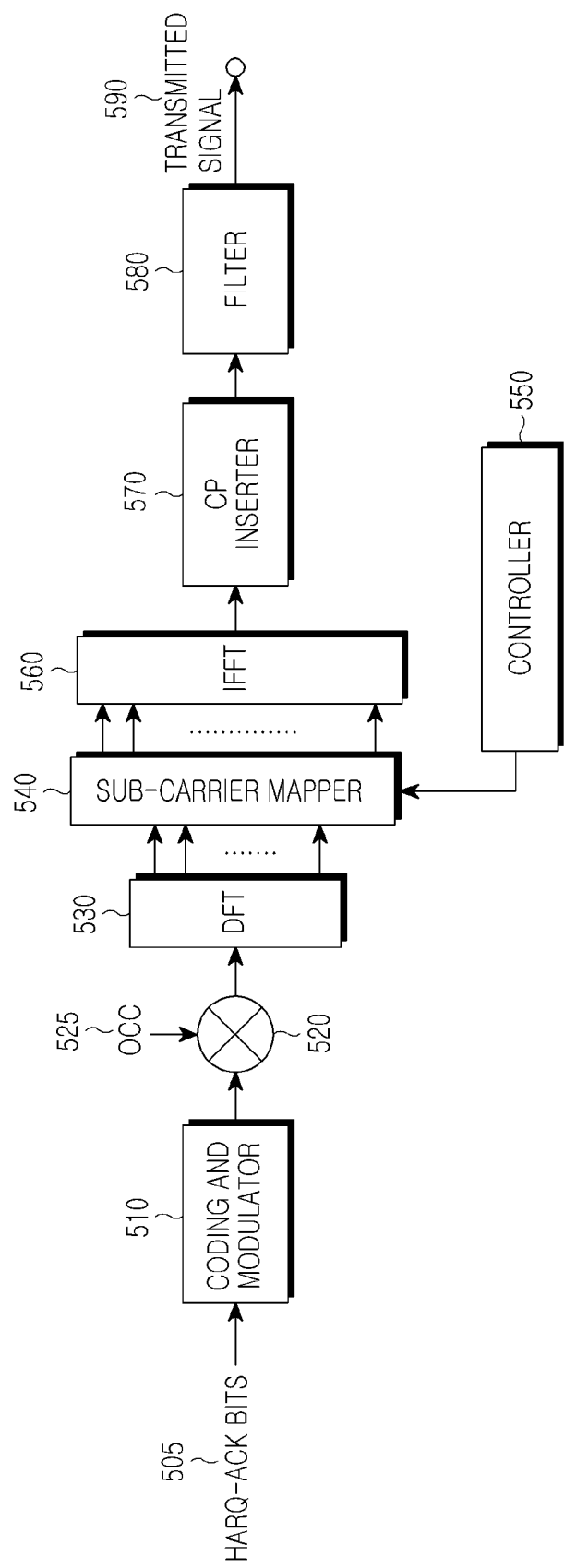
FIG. 5 illustrates a conventional UE transmitter of a HARQ-ACK signal in a PUCCH.
Figure 6:
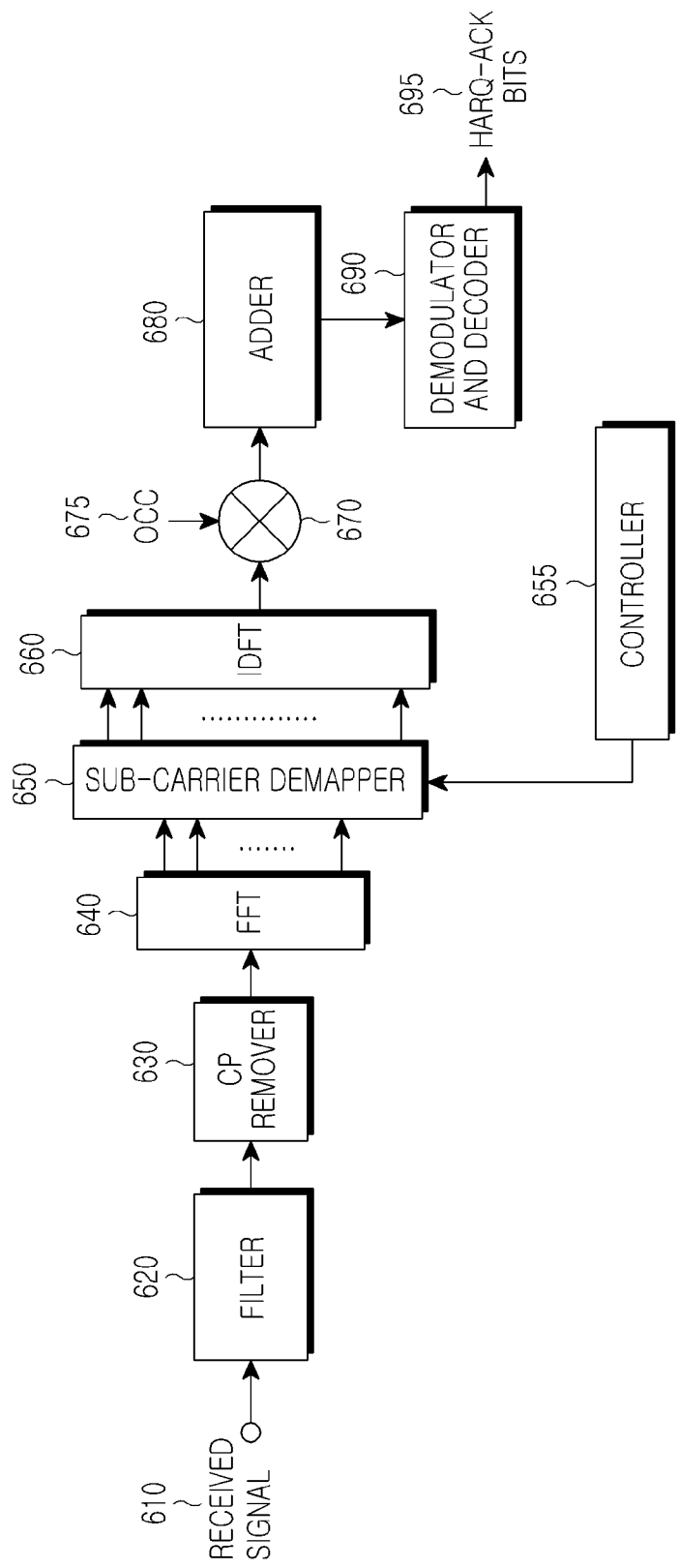
FIG. 6 illustrates a conventional NodeB receiver of a HARQ-ACK signal in a PUCCH.
Figure 7:
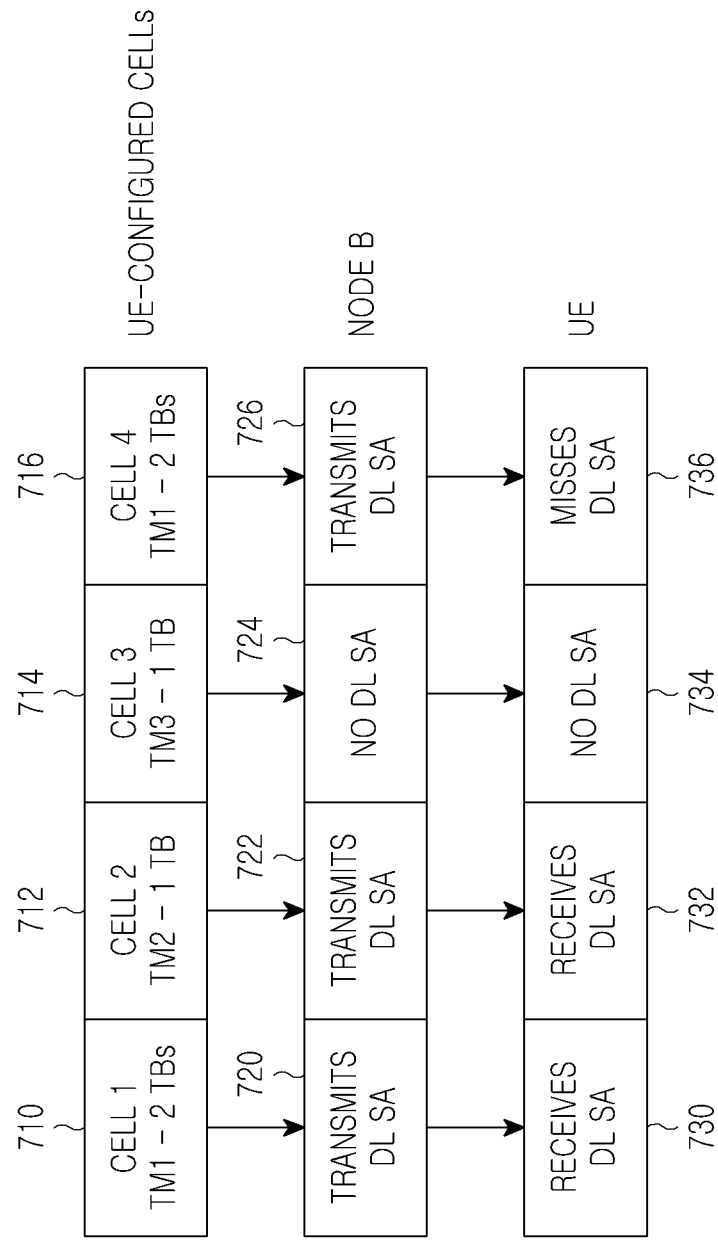
FIG. 7 is a diagram illustrating a conventional set of configured cells to a UE, a subset of configured cells with PDSCH transmission in a given subframe from a NodeB to the UE, and a further subset of cells where the PDSCH transmission from the NodeB is received by the UE.

Various embodiments of the present invention will now be described in more detail hereinafter with reference to the accompanying drawings. The present invention may, however, be embodied in many different forms and should not be construed as limited to the embodiments set forth herein. Rather, these embodiments are provided so that this disclosure will be thorough and complete and will fully convey the scope of the present invention to those skilled in the art.

Additionally, although the embodiments of the present invention will be described below with reference to DFT-spread OFDM transmission, the embodiments are also applicable to Frequency Division Multiplexing (FDM) transmissions in general and to Single-Carrier Frequency Division Multiple Access (SC-FDMA) and OFDM in particular.

Certain embodiments of the present invention consider designs for a cell-domain DAI IE in DL SAs (DL DAI) and in UL SAs (UL DAI), the determination of the HARQ-ACK payload in a PUSCH, the setting of the HARQ-ACK signal transmission power in a PUCCH, and the overall support of HARQ-ACK transmission in conjunction with DL CA.

These embodiments of the present invention consider an FDD communication system. SPS PDSCH transmissions (without an associated DL SA) are not explicitly considered, but the respective HARQ-ACK information bits, if any, can be assumed to be placed at a predetermined location in the HARQ-ACK CW, e.g., in the beginning of the HARQ-ACK CW. Further, a DL SA not being associated with a respective PDSCH, but instead being used to serve other purposes, will not be explicitly considered, but a UE is assumed to generate a HARQ-ACK bit corresponding to such DL DA. Also, unless explicitly mentioned, HARQ-ACK spatial-domain bundling is not assumed. The modification for each embodiment of the present invention when spatial-domain bundling applies is straightforward and will be regularly mentioned. The NodeB and a UE are assumed to have the same understanding of the relative index of each cell configured to the UE, e.g., Cell 0, Cell 1, etc.

With respect to single-cell TDD, there are two main differences with DL CA:

a) The NodeB knows a total number of cells with transmission of DL SAs or PDSCHs to a UE in a subframe. In TDD, the NodeB is not assumed to know in advance the total number of subframes with transmission of DL SAs or PDSCHs to a UE.

b) The configured PDSCH TM to a UE can vary among configured cells. In TDD, it is assumed to be the same across all DL subframes having transmission of HARQ-ACK information in the same UL subframe.

Cell-Domain UL DAI IE

For a UE configured with a single DL cell in an FDD system, as all PDCCHs to the UE are transmitted in the same cell, it is not necessary to have a UL DAI IE in a UL SA scheduling a PUSCH to indicate whether the UE should include in the PUSCH HARQ-ACK information associated with a DL SA, because when a UE misses the DL SA, it is also highly likely to the UE will also miss the UL SA in the same subframe.

The above-described operational characteristic is not applicable for a UE configured with a DL CA because a UL SA may be transmitted in a cell without a DL SA. Accordingly, the correlation between a DL SA miss and a UL SA miss can be very low. This is analogous to single-cell TDD where a UL DAI IE is included in UL SAs to account for the event that a UL SA is received in a subframe while DL SAs are missed in some other subframes.

Unlike single-cell TDD, in accordance with an embodiment of the present invention, for DL CA in an FDD system, a single-bit UL DAI IE is used to indicate whether a UE should include HARQ-ACK information in a PUSCH transmission is sufficient because for all (cell-domain) DL DAI IE design alternatives that will be subsequently described, a multi-bit UL DAI IE is useful only when all DL SAs are missed. However, as UL SA reception in at least one cell is assumed and as DL SA misses among different cells are typically not highly correlated, the probability of missing all DL SAs is practically negligible.

For a TDD system, the existence of the UL DAI IE does not depend on whether the UE is configured with a single DL cell or with multiple DL cells. When a DL DAI IE is not supported, a multi-bit UL DAI IE can be considered to dimension the HARQ-ACK payload in the PUSCH as for a conventional single-cell TDD system.

For a TDD system and a UE configured c cells for DL CA, as the HARQ-ACK transmission is in a single PUSCH, the size of the UL DAI IE should scale with C relative to the UL DAI IE for single-cell operation. For example, the interpretation of a UL DAI IE including 2 bits in a single-cell mode is shown in Table 1 for a given configuration of DL/UL subframes. Assuming that all C cells have the same configuration of DL/UL subframes, the number of UL DAI IE bits should be equal to 2C

TABLE 1

Single-Cell Mode in TDD - Mapping UL
DAI IE values to number of PDSCHs.

| $V_{DAI}^{UL}$ (or $V_{DAI}^{DL}$) | Number of PDSCH (or DL SAs) |
|---|---|
| 0, 0 | 1 |
| 0, 1 | 2 |
| 1, 0 | 3 |
| 1, 1 | 0 |

In order to avoid having a variable number of UL DAI IE bits, based on the value of C, the maximum value $C_{max}$ may be used and the number of cell-domain UL DAI IE bits is then equal to $2C_{max}$. For example, for $C_{max}=5$, the cell-domain UL DAI IE includes 10 bits. To avoid an overhead of 10 bits in UL SAs, compression of the mapping or of the HARQ-ACK payload can be applied.

In one approach, HARQ-ACK bundling across cells is applied in TDD. The operation is then equivalent to that of a single-cell system and a 2-bit UL DAI IE suffices.

In another approach, the number of cell-domain UL DAI IE bits is maintained at 2, but their interpretation may change depending on the value of C. For example, for C=2 or C=3, the interpretation of the cell-domain UL DAI IE can be as in Table 2.

Alternatively, a smaller than linear increase in the number of cell-domain UL DAI IE bits can be considered. For example, the cell-domain UL DAI IE may increase by 1 bit. The same process can apply for the DL DAI IE in DL SAs for a TDD system in a CA mode.

TABLE 2

DL CA mode (2 cells) in TDD - Mapping
UL DAI IE values to number of PDSCHs.

| $V_{DAI}^{UL}$ (or $V_{DAI}^{DL}$) | Number of PDSCH (or DL SAs) – C = 2 | Number of PDSCH (or DL SAs) – C = 3 |
|---|---|---|
| 0, 0 | 2 | 3 |
| 0, 1 | 4 | 6 |
| 1, 0 | 6 | 9 |
| 1, 1 | 0 | 0 |

Figure 8:
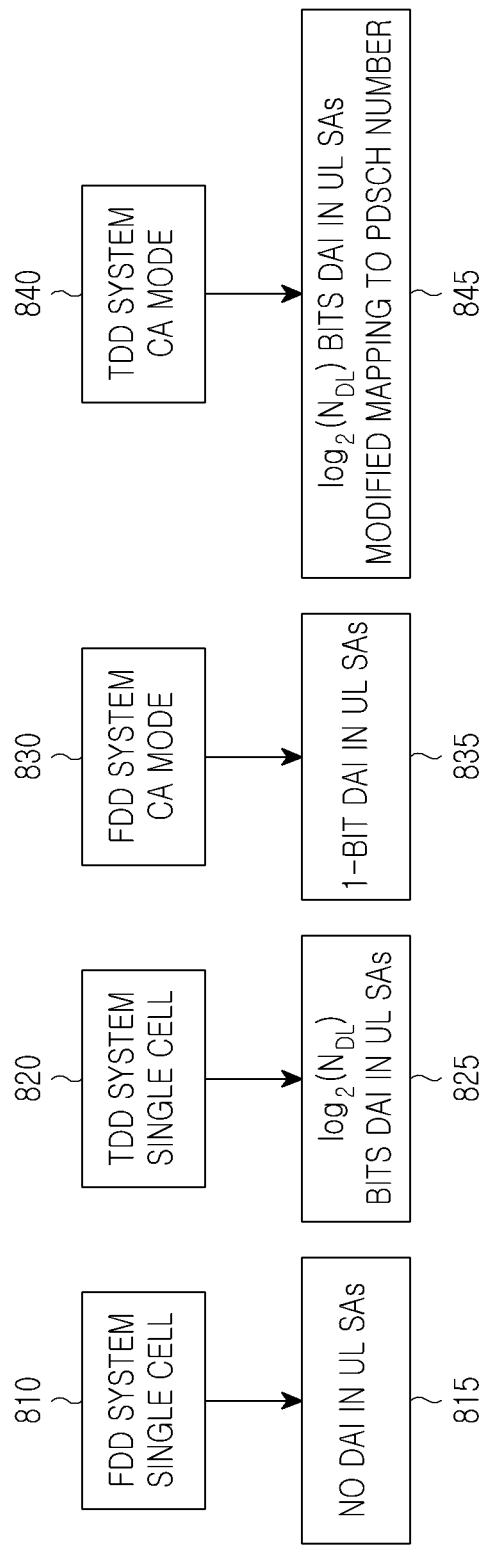
FIG. 8 is a diagram illustrating a cell-domain UL DAI IE depending on a duplex mode (FDD or TDD) and on a use of DL CA, according to an embodiment of the present invention.

FIG. 8 illustrates a cell-domain UL DAI IE depending on a duplex mode (FDD or TDD) and on a use of DL CA, according to an embodiment of the present invention.

Referring to FIG. 8, for an FDD system operating in a single-cell mode 810, there is no UL DAI IE 815. For a TDD system operating in a single-cell mode, there is a UL DAI IE in the UL SAs 825. For an FDD system operating in a DL CA mode 830, there is a single bit UL DAI IE 835. For a TDD system operating in a DL CA mode 840, the number of UL DAI IE bits is compressed to be the same as for operation in a single-cell mode, with mapping depending of the number of configured cells 845.

Cell-Domain DL DAI IE

The following options are considered for the cell-domain DL DAI IE design:
   a) Absolute Counter DL DAI IE
   b) Forward Relative Counter (FRC) DL DAI IE
   c) Bit-Map DL DAI IE
   d) No DL DAI IE The determination of the HARQ-ACK payload for multiplexing in the PUSCH and the determination of the HARQ-ACK signal transmission power for transmission in the PUCCH are subsequently discussed for each option.

Absolute Counter DL DAI IE

An Absolute Counter DL DAI IE informs a UE the total number $P \leq C$ of DL SAs in a given subframe and a UE expects it to have the same value (P) in all DL SAs it receives. For example, for a maximum of C=5 cells, the Absolute Counter DL DAI IE may consist of 3 bits. However, a 2-bit Absolute Counter DL DAI IE is sufficient and can be interpreted as shown in Table 3.

An error may occur only if a UE misses 4 DL SAs (when 4 or 5 DL SAs are transmitted). For example, if there are 4 DL SAs transmitted to a UE and the UE misses all of them, the Absolute Counter DL DAI IE may be interpreted by the UE as indicating 0 DL SAs, instead of 4 DL SAs. However, the probability of these error events is practically negligible.

TABLE 3

Mapping Absolute Counter DL DAI IE values
to number of PDSCHs (or DL SAs).

| Absolute Counter DL DAI IE | Number of PDSCH Transmissions (or DL SAs) – C = 5 |
|---|---|
| 0, 0 | 0 |
| 0, 1 | 1 |
| 1, 0 | 2 |
| 1, 1 | 3 |
| 0, 0 | 4 |
| 0, 1 | 5 |

As the Absolute Counter DL DAI IE provides only the total number $P \leq C$ of DL SAs to a UE in a DL subframe and does not inform which cells transmitted DL SAs, a UE cannot know which DL SA and associated PDSCH it missed, and therefore, the UE cannot properly generate the HARQ-ACK information.

For example, for a UE with C=3 configured cells, with each cell having the same PDSCH TM (for simplicity) requiring feedback of 1 HARQ-ACK bit, if DL SAs in a given subframe are transmitted in the first and second cells (P=2) and the UE only receives the DL SA in the second cell, the UE cannot know if the HARQ-ACK feedback should be {NACK/DTX, ACK or NACK} or {ACK or NACK, NACK/DTX}, as the UE does not know whether it missed the PDSCH in the first cell or in the third cell. Therefore, the UE and the NodeB cannot be ensured to have the same understanding about the generated HARQ-ACK information.

This issue can be resolved if a UE also provides DTX feedback for each configured cell. As each cell is to be identified, the DTX payload is C bits. In an alternative embodiment, for P=4 or P=5, the DTX payload can be reduced to a maximum of 3 bits, if the probability of a UE missing 3 or more DL SA can be neglected in practice. In the following, a generalization of the DTX payload to D bits is assumed (for example, D=P if P≤3 and D=3 if P>3).

If the DTX payload is jointly coded with a HARQ-ACK payload, the HARQ-ACK payload is fixed to $O_{HARQ-ACK}$=2P bits, if P≤$C_2$, or $O_{HARQ-ACK}$=P+$C_2$ bits, if P>$C_2$. Then, adding the DTX payload, the total payload is $O_{total}$=2P+D bits, if P≤$C_2$ or $O_{total}$=P+$C_2$+D bits, if P>$C_2$.

If the DTX payload and the HARQ-ACK payload are separately coded (the same coding scheme as for D HARQ-ACK bits may apply for the DTX payload), the minimum HARQ-ACK payload of $O_{HARQ-ACK}$=R+$R_2$ bits is achieved while the DTX payload is $O_{DTX}$=D bits. Moreover, there is no possibility for ambiguity if no DL SA is received (a 1-bit UL DAI IE will work for multiple DL SAs). The NodeB first decodes the DTX CW, and then determines the size and decodes the HARQ-ACK CW. If DTX is indicated for a cell from which a DL SA was transmitted, the respective HARQ-ACK bit can have a predetermined value, such as a NACK (binary 0), which the NodeB receiver may exploit to improve the detection reliability, because linear block coding is assumed.

The DTX CW should be placed prior to the HARQ-ACK CW, as the DTX CW has a predetermined size and should be decoded first in order for the NodeB to determine the HARQ-ACK CW size. The number of HARQ-ACK CW REs in the PUSCH is determined for a payload of $O_{HARQ-ACK}$=R+$R_2$ bits and the number of DTX CW REs in the PUSCH is determined for a payload of $O_{DTX}$=D bits. A DTX-specific offset value $\beta_{offset}^{DTX}$ may also be defined to ensure the desired DTX reception reliability; otherwise, $\beta_{offset}^{DTX}$ may be assumed to be the same as $\beta_{offset}^{HARQ-ACK}$.

If the DTX payload and the HARQ-ACK payload are jointly coded, the exact ordering of HARQ-ACK bits and DTX bits does not matter, as long as the UE encoder and the NodeB decoder consider the same ordering, as the size of the combined CW is predetermined. For example, the DTX bits can be placed after the HARQ-ACK bits or the HARQ-ACK bits conveying actual information (non-DTX) can be placed first. The number of PUSCH REs for the resulting CW is determined using previously described formulas for a payload of $O_{total}$=2P+D bits if P≤$C_2$, and $O_{total}$=P+$C_2$+D bits if P>$C_2$.

Figure 9:
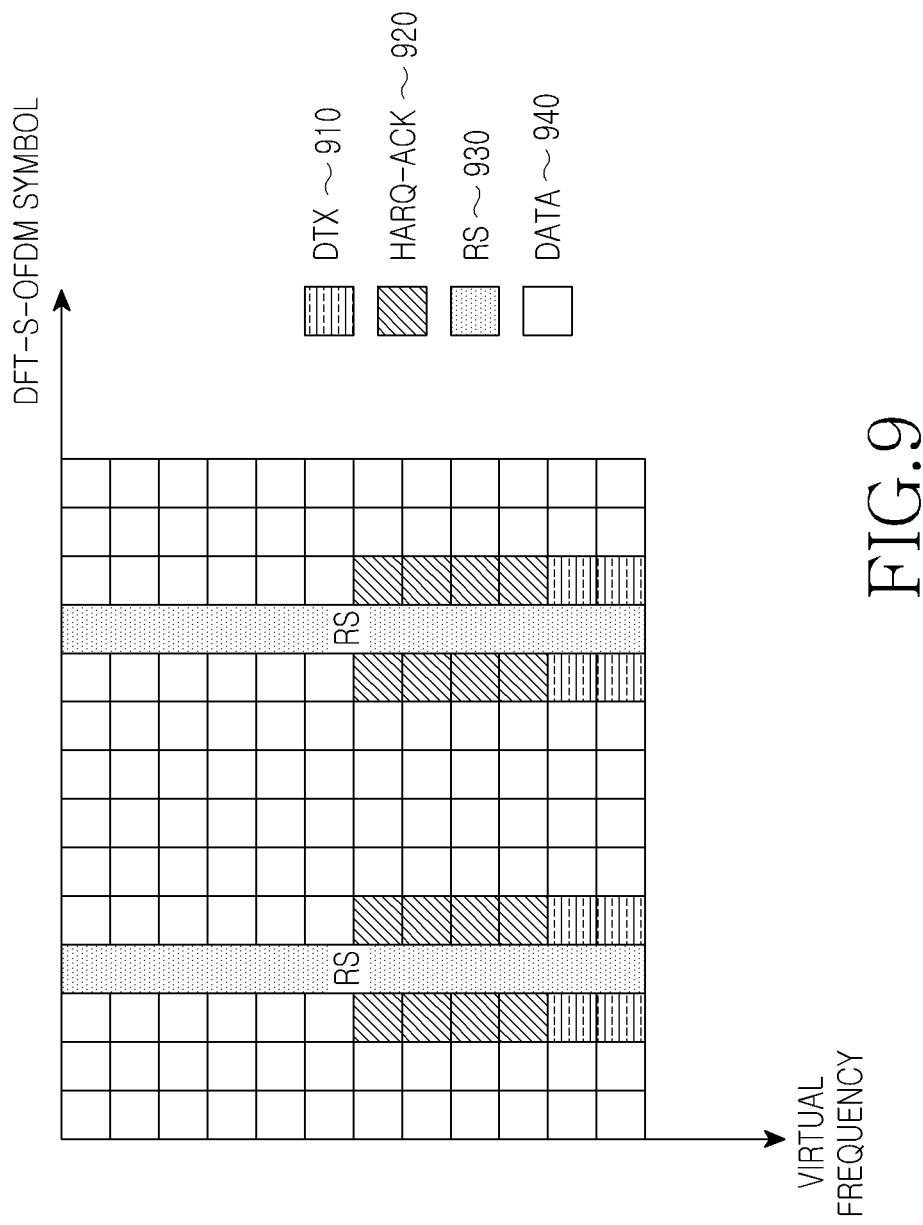
FIG. 9 is a diagram illustrating placement of DTX codeword sub-carriers and of HARQ-ACK codeword sub-carriers in a PUSCH, according to an embodiment of the present invention.

FIG. 9 illustrates DTX CW REs and HARQ-ACK CW REs placement in a PUSCH, according to an embodiment of the present invention.

Referring to FIG. 9, similar to HARQ-ACK CW REs 920, DTX CW REs 910 are placed in two DFT-S-OFDM symbols next to an RS 930 in each subframe slot starting from a top RE (in the virtual frequency domain) to provide a known starting point to the NodeB. The number of DTX CW REs is determined from the DTX payload of $O_{DTX}$=D bits and is known to the NodeB. The HARQ-ACK CW REs are placed after the DTX CW REs and their number is determined from the HARQ-ACK payload of $O_{HARQ-ACK}$=R+$R_2$ bits, which is not known in advance to the NodeB, but becomes known after decoding the DTX CW. The remaining of the PUSCH subframe is used to transmit data information 940 and possibly other control information and SRS, i.e., a last DFT-S-OFDM symbol of the subframe.

Herein below, for brevity, a description of the functions of the UE transmitter and of the NodeB receiver when there is no DTX feedback, when separately coding HARQ-ACK payload and DTX payload, and when jointly coding HARQ-ACK payload and DTX payload will be given alternatively for each candidate DL DAI IE design as there are no material changes in the corresponding operations. For the Absolute Counter DL DAI IE, separate coding is described. For an FRC DL DAI IE, when there is no DTX feedback is described. For a Bit-Map DL DAI IE, joint coding is described.

If HARQ-ACK payload and DTX payload are separately coded, UE operations for transmitting and NodeB operations for receiving the HARQ-ACK payload are identical for all DL DAI IE designs under consideration, even through the information provided by the DL DAI IEs may vary. Each coding operation can be based, for example, on repetition coding, or simplex coding, or on (32, O) RM block coding.

Figure 10:
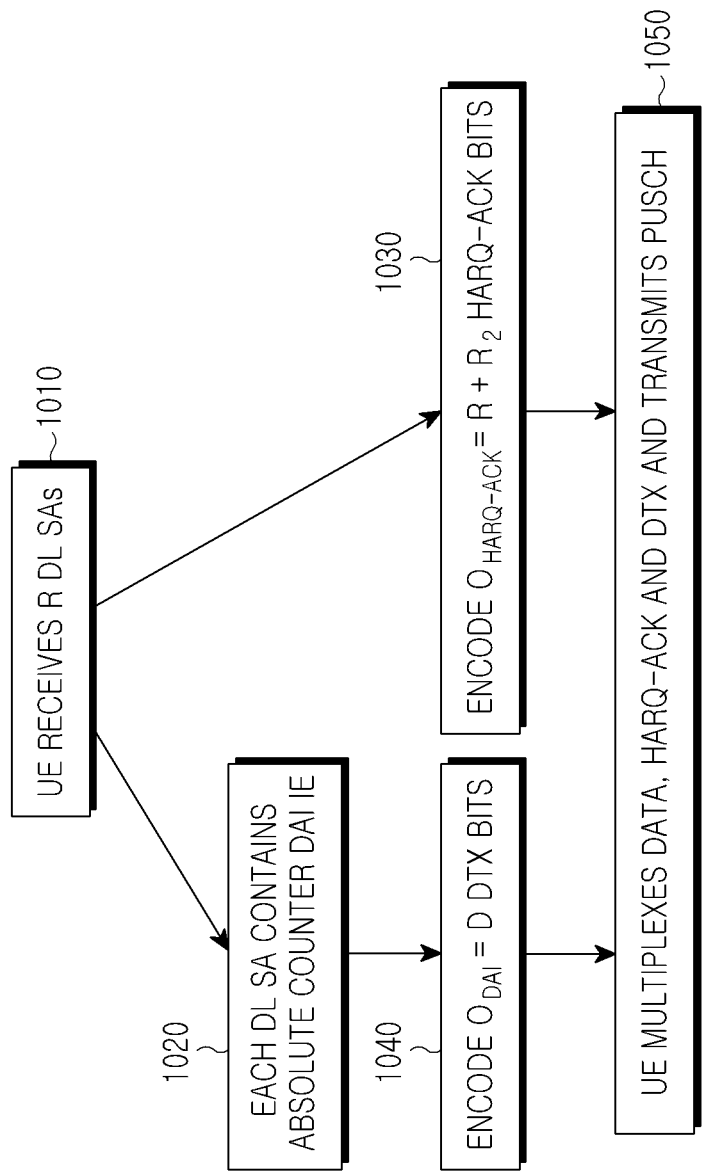
FIG. 10 is a flowchart illustrating a UE transmitter multiplexing HARQ-ACK information in a PUSCH using an Absolute Counter DL DAI IE and separately encoding a HARQ-ACK payload and a DTX payload, according to an embodiment of the present invention.

FIG. 10 is a flowchart illustrating a UE transmitter for multiplexing HARQ-ACK information in a PUSCH using an Absolute Counter DL DAI IE and separately encoding a HARQ-ACK payload and a DTX payload.

Referring to FIG. 10, in a given DL subframe n, the UE receives R DL SAs in step 1010. Each of the R DL SAs includes an Absolute Counter DL DAI IE, which informs the UE of the total number P of DL SAs in subframe n in step 1020. After decoding the data TBs in each PDSCH, the UE generates and encodes the HARQ-ACK payload of $O_{HARQ-ACK}$=R+$R_2$ bits in step 1030. Based on the value of the Absolute Counter DL DAI IE, the UE also separately encodes the DTX payload of $O_{DTX}$=D bits in step 1040. Due to HARQ process delay, the UE transmits the multiplexed data, HARQ-ACK, and DTX in the PUSCH in subframe n+4 in step 1050.

Figure 11:
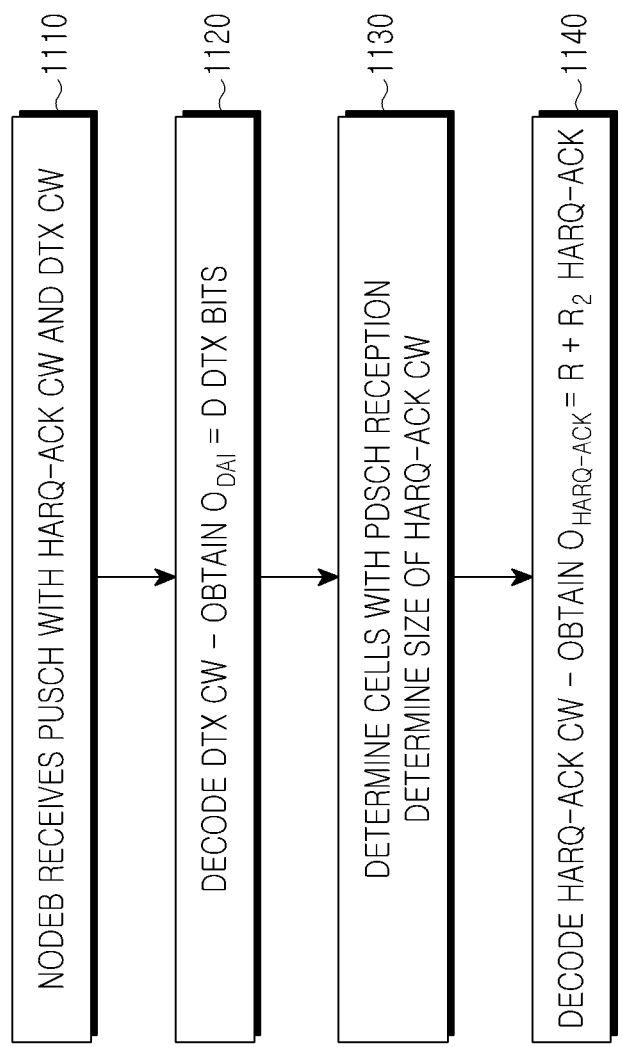
FIG. 11 is a flowchart illustrating a NodeB receiver receiving HARQ-ACK information multiplexed in a PUSCH using an Absolute Counter DL DAI IE and separately decoding s HARQ-ACK payload and s DTX payload, according to an embodiment of the present invention.

FIG. 11 is a flowchart illustrating a NodeB receiver receiving HARQ-ACK information multiplexed in a PUSCH using an Absolute Counter DL DAI IE and separately decoding s HARQ-ACK payload and s DTX payload, according to an embodiment of the present invention.

Referring to FIG. 11, the NodeB first receives the PUSCH including the HARQ-ACK CW and the DTX CW in step 1110. The NodeB then decodes the DTX CW to obtain the $O_{DTX}$=D bits in step 1120. Based on decoded DTX CW, in step 1130, the NodeB determines the cells from which the UE received PDSCH and the size of the HARQ-ACK CW. In step 1140, the NodeB decodes the HARQ-ACK CW to obtain the payload of $O_{HARQ-ACK}$=R+$R_2$ bits.

For HARQ-ACK transmission in a PUCCH and joint coding of the HARQ-ACK payload and of the DTX payload, although the total payload is $O_{HARQ-ACK}$+$O_{DTX}$=C+$C_2$+D bits, the UE adjusts the PUCCH transmission power in UL subframe i assuming a payload of $O_{Tx\_pwr}$=2P+D bits if P≤$C_2$ or of $O_{Tx\_pwr}$=P+$C_2$+D bits if P>$C_2$ and $P_{PUCCH}(i)$=$\min\{P_{CMAX}, h(O_{Tx\_pwr})+Q(i)\}$.

With the above adjustment, the HARQ-ACK signal transmission is reduced as $O_{Tx\_pwr}$ is smaller than or equal to $O_{HARQ-ACK}$+$O_{DTX}$. This in turn reduces interference generated by the HARQ-ACK signal transmission and reduces UE power consumption without causing the HARQ-ACK CW reception reliability to fall below a desired target. Using $O_{Tx\_pwr}$ instead of $O_{HARQ-ACK}$+$O_{DTX}$ to determine the HARQ-ACK signal transmission power in the PUCCH is practical due the use of a linear block code, such as the RM block code, and the use of QPSK for the encoding and modulation of the HARQ-ACK bits, respectively. These two aspects enable the NodeB receiver to exploit a-priori information about some of the $O_{HARQ-ACK}$=C+$C_2$ bits in the HARQ-ACK CW in order to improve its detection reliability.

Forward Relative Counter DL DAI IE

The FRC DL DAI IE exploits the fact that the NodeB knows the total number of DL SAs it transmits to a UE in a given subframe. Then, by ordering the configured cells, for example, through higher layer signaling, a 3-bit FRC DL DAI IE can serve both as a Relative Counter DL DAI and to indicate if there is an additional DL SA for a maximum of C=5 configured cells. The first 2 bits indicate the DL SA number (relative counter) and the last bit indicates whether there is another DL SA (forward indication). This avoids the error case of the relative counter DL DAI in a TDD system, when the last DL SA is missed. Error cases exist when consecutive DL SAs including the last one are missed, but for each error case, the respective probability is at least an order of magnitude smaller than the one of missing only the last DL SA.

Table 4 indicates FRC DL DAI IE values as a function of a number of DL SAs. For 5 DL SAs, the common "111" entry in the $4^{th}$ and $5^{th}$ DL SA does not lead to a confusion in the $5^{th}$ DL SA as the maximum value is C=5 (any other value, for example "000", may also be selected). The order of the cells is known to the UE.

TABLE 4

Forward Relative Counter DAI IE Values as a Function of Number of DL SAs.

| Number of PDSCH | DAI in $1^{st}$ DL SA | DAI in $2^{nd}$ DL SA | DAI in $3^{rd}$ DL SA | DAI in $4^{th}$ DL SA | DAI in $5^{th}$ DL SA |
|---|---|---|---|---|---|
| 1 | 000 | N/A | N/A | N/A | N/A |
| 2 | 001 | 010 | N/A | N/A | N/A |
| 3 | 001 | 011 | 100 | N/A | N/A |
| 4 | 001 | 011 | 101 | 110 | N/A |
| 5 | 001 | 011 | 101 | 111 | 111 |

With the relative counter part of the FRC DL DAI IE, the UE can know the relative order of the DL SAs and therefore, the UE can properly perform the HARQ-ACK feedback without DTX feedback under the following restrictions:

a) DTX is mapped to NACK.

b) Either spatial-domain bundling or the same TM (for HARQ-ACK generation purposes only) is enforced across all cells.

If HARQ-ACK spatial-domain bundling is used (when applicable), the HARQ-ACK payload is $O_{HARQ-ACK}=P$ bits. If spatial-domain bundling is not used, the HARQ-ACK payload is $O_{HARQ-ACK}=2P$ bits if $P \le C_2$ or $O_{HARQ-ACK}=P+C_2$ bits, if $P > C_2$. With the FRC DL DAI IE, the HARQ-ACK payload of $O_{HARQ-ACK}$ bits may be different than the total number of TBs a UE receives (R+$R_2$) as the UE knows to include additional HARQ-ACK bits (NACK values) for TBs that the NodeB transmitted, but that the UE did not receive.

The previous two restrictions can be avoided if a UE also provides DTX information (D bits). Then, with joint coding of the DTX payload and the HARQ-ACK payload, the total payload is $O_{total}=2P+D$ bits if $P \le C_2$ and $O_{total}=P+C_2+D$ bits if $P > C_2$. For separate coding of the HARQ-ACK payload and the DTX payload, the minimum HARQ-ACK payload of $O_{HARQ-ACK}=R+R_2$ bits can be achieved. The DTX payload is $O_{DTX}=D$ bits. The same placement criteria for the PUSCH Res, as for the Absolute Counter DL DAI IE, applies for the joint HARQ-ACK and DTX CW (joint coding) and for the separate HARQ-ACK CW and DTX CW.

Figure 12:
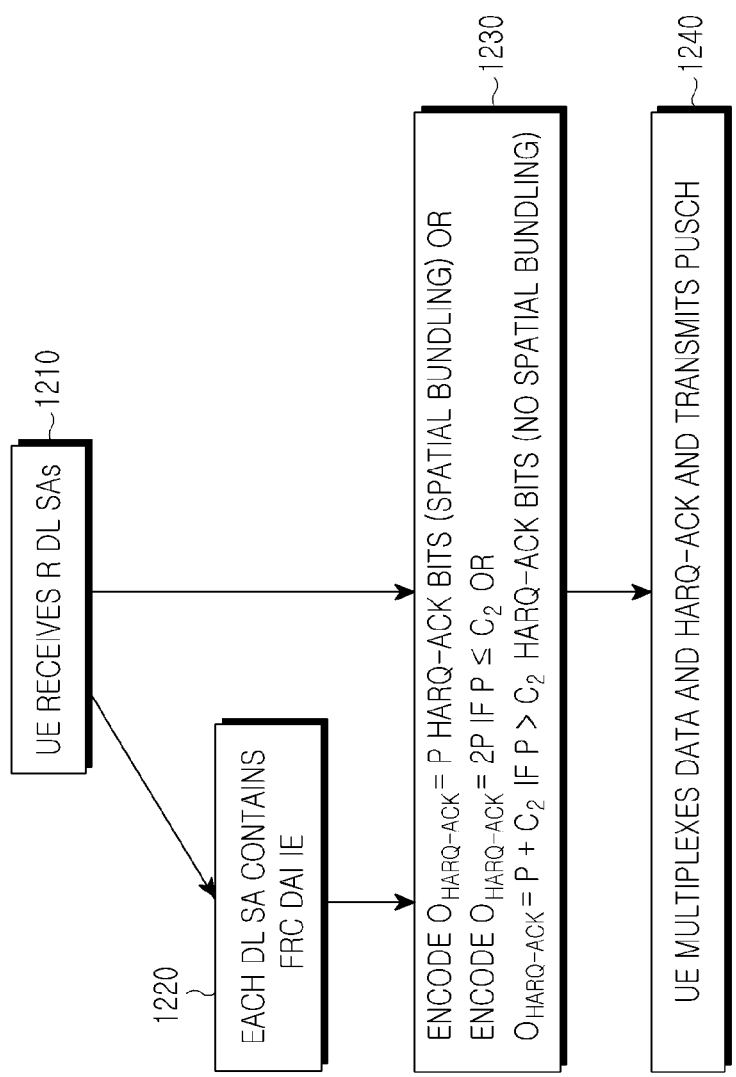
FIG. 12 is a flowchart illustrating a UE transmitter multiplexing HARQ-ACK information in a PUSCH using a Forward Relative Counter (FRC) DL DAI IE, assuming no DTX feedback, according to an embodiment of the present invention.

FIG. 12 is a flowchart illustrating a UE transmitter multiplexing HARQ-ACK information in a PUSCH using a Forward Relative Counter (FRC) DL DAI IE, assuming no DTX feedback, according to an embodiment of the present invention.

Referring to FIG. 12, in DL subframe n, the UE receives R DL SAs in step 1210. Each of the R DL SAs includes the FRC DL DAI IE, which informs the UE of each DL SA number and, if at least one of the last 2 DL SAs is correctly received, of the total number P of DL SAs, in step 1220. In step 1230, the UE generates and encodes the HARQ-ACK payload of $O_{HARQ-ACK}=P$ bits, if HARQ-ACK spatial-domain bundling (when applicable) is used, or generates and encodes the HARQ-ACK payload of $O_{HARQ-ACK}=2P$ bits, if $P \le C_2$ or of $O_{HARQ-ACK}=P+C_2$ bits if $P > C_2$, when spatial-domain bundling is not used. In step 1240, accounting for a HARQ process delay of 4 subframes, the UE transmits, in UL subframe n+4, the multiplexed data and HARQ-ACK in a PUSCH.

Figure 13:
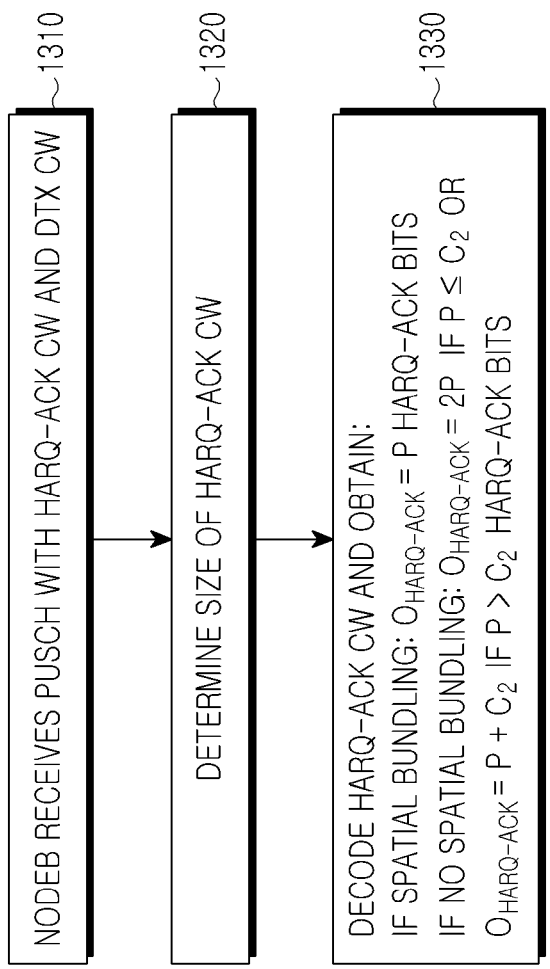
FIG. 13 is a flowchart illustrating a NodeB receiver receiving HARQ-ACK information multiplexed in a PUSCH using an FRC DL DAI IE, assuming no DTX feedback, according to an embodiment of the present invention.

FIG. 13 is a flowchart illustrating a NodeB receiver receiving HARQ-ACK information multiplexed in a PUSCH using an FRC DL DAI IE, assuming no DTX feedback, according to an embodiment of the present invention.

Referring to FIG. 13, in step 1310, the NodeB first receives the PUSCH including the HARQ-ACK CW. In step 1320, based on the total number of DL SAs indicated by the last value of the FRC DL DAI IE, the NodeB determines the HARQ-ACK CW size. In step 1330, the NodeB decodes the HARQ-ACK CW and obtains the HARQ-ACK payload of:

$O_{HARQ-ACK}=P$ bits, when spatial-domain bundling is used (when applicable); or $O_{HARQ-ACK}=2P$ bits, if $P \le C_2$, or of $O_{HARQ-ACK}=P+C_2$ bits, if $P > C_2$, when spatial-domain bundling is not used.

The NodeB knows in advance whether the UE applies HARQ-ACK spatial-domain bundling (when applicable) and can therefore correctly determine the HARQ-ACK CW size and correctly determine the association of HARQ-ACK payload with the respective PDSCH transmissions.

For HARQ-ACK transmission in a PUCCH without DTX feedback, although the HARQ-ACK payload is $O_{HARQ-ACK}=C+C_2$ bits, the UE adjusts the PUCCH transmission power assuming the transmission of $O_{Tx\_pwr}=P$ HARQ-ACK bits, when spatial-domain bundling applies, or assuming the transmission of $O_{Tx\_Pwr}=2P$ bits, if $P \le C_2$, and $O_{Tx\_pwr}=P+C_2$ bits, if $P > C_2$, when spatial-domain bundling does not apply. Then, in UL subframe i, $P_{PUCCH}(i)=\min\{P_{CMAX}, h(O_{TX\_pwr})+Q(i)\}$.

As described above, reducing the HARQ-ACK signal transmission power in the PUCCH by using $O_{Tx\_pwr}$ instead of $O_{HARQ-ACK}$ is possible due to the use of a linear block code and QPSK for the encoding and modulation, respectively, of the HARQ-ACK bits. This enables the NodeB receiver to exploit a-priori information about some of the $O_{HARQ-ACK}=C+C_2$ bits and improve the detection reliability of the HARQ-ACK CW. In this manner, unnecessary interference and UE power consumption are avoided without compromising the desired reception reliability target for the HARQ-ACK CW.

For HARQ-ACK transmission in a PUCCH and joint coding of the HARQ-ACK payload with the DTX payload, using the same principle as above, instead of the UE considering $O_{HARQ-ACK}+O_{DTX}=C+C_2+D$ bits to determine the HARQ-ACK signal transmission power, it considers $O_{Tx\_pwr}=2P+D$ bits, if $P \le C_2$, or it considers $O_{Tx\_pwr}=P+C_2+D$ bits, if $P > C_2$. Then, in a UL subframe i, $P_{PUCCH}(i)=\min\{P_{CMAX}, h(O_{Tx\_pwr})+Q(i)\}$.

Bit-Map DL DAI IE

The Bit-Map DL DAI IE indicates each configured cell with DL SA transmission (for example, using a binary "1", when there is DL SA transmission and using a binary "0", when there is no DL SA transmission) and includes C bits, which the UE expects to have the same value in all DL SAs it receives. For a maximum of C=5 configured cells, the Bit-map DL DAI IE includes 5 bits. Using the Bit-Map DL DAI IE, the UE can perfectly dimension the HARQ-ACK feedback (unless all DL SAs are missed). For brevity, no spatial-domain HARQ-ACK bundling is considered in the following description.

The HARQ-ACK payload is $O_{HARQ-ACK}=P+P_2$ bits. When using the Bit-Map DL DAI IE, the HARQ-ACK payload may be different than the total number of $R+R_2$ TBs the UE receives, as the UE knows to include additional HARQ-ACK bits (NACK values) for TBs of PDSCH that the UE did not receive.

If the HARQ-ACK payload of $O_{HARQ-ACK}=P+P_2$ bits is jointly coded with the DTX payload of $O_{DTX}=D$ bits, the total payload is $O_{total}=P+P_2+D$. If the HARQ-ACK payload is separately coded from the DTX payload, because the NodeB can use the DTX information to determine the number of PDSCHs (and TBs) received by the UE, the HARQ-ACK payload is $O_{HARQ-ACK}=R+R_2$ bits.

When using a bit-map DAI, DTX feedback from a UE is not required for the proper detection of the HARQ-ACK payload. Instead, the UE can transmit a NACK for each PDSCH TB it did not receive, thereby treating an absence of a TB reception as an incorrect reception. The same placement criteria applies for the REs in the PUSCH as for the Absolute Counter DL DAI IE for the joint HARQ-ACK and DTX CW (joint coding) and for the individual HARQ-ACK CW and DTX CW (separate coding).

For joint coding of the HARQ-ACK payload and the DTX payload, each DTX may be combined with each HARQ-ACK in a 3-state or a 5-state information for a total payload of $O=\lceil \log_2((P-P_2)^3+(P_2)^5-1) \rceil$ bits. Here, both the UE and the NodeB implement Tables mapping a series of ACK, NACK, and DTX states to a CW of O bits for savings of 1-2 bits.

Figure 14:
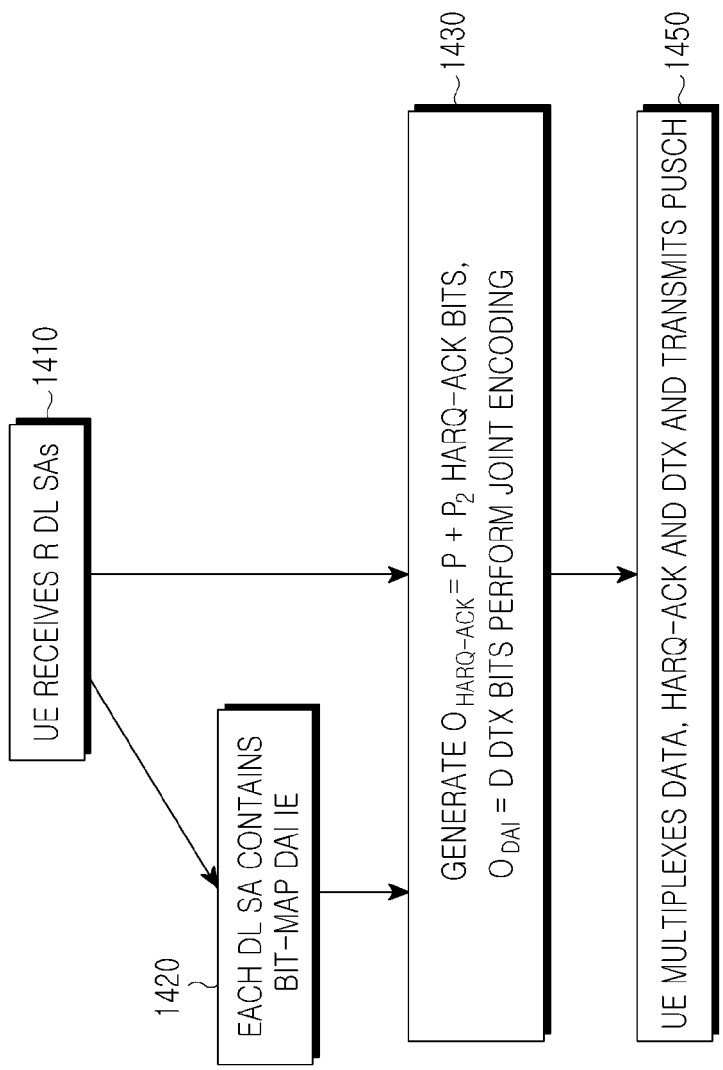
FIG. 14 is a flowchart illustrating a UE transmitter multiplexing HARQ-ACK information in a PUSCH using a Bit-Map DL DAI IE and jointly encoding a HARQ-ACK payload and a DTX payload, according to an embodiment of the present invention.

FIG. 14 is a flowchart illustrating a UE transmitter multiplexing HARQ-ACK information in a PUSCH using a Bit-Map DL DAI IE and jointly encoding a HARQ-ACK payload and a DTX payload, according to an embodiment of the present invention.

Referring to FIG. 14, in a given DL subframe n, the NodeB transmits P DL SAs and the UE receives R DL SAs in step 1410. Each of the R DL SAs includes the Bit-Map DL DAI IE informing the UE the total number P of DL SAs and the configured cells transmitting these DL SAs in step 1420. After decoding the data in each PDSCH associated with each received DL SA, in step 1430, the UE generates the HARQ-ACK payload of $O_{HARQ-ACK}=P+P_2$ bits and the DTX payload of $O_{DTX}=D$ bits, and the performs joint encoding of the HARQ-ACK payload and the DTX payload. In step 1450, because of the HARQ process delay, the UE transmit the multiplexed data, HARQ-ACK, and DTX in the PUSCH at UL subframe n+4.

Figure 15:
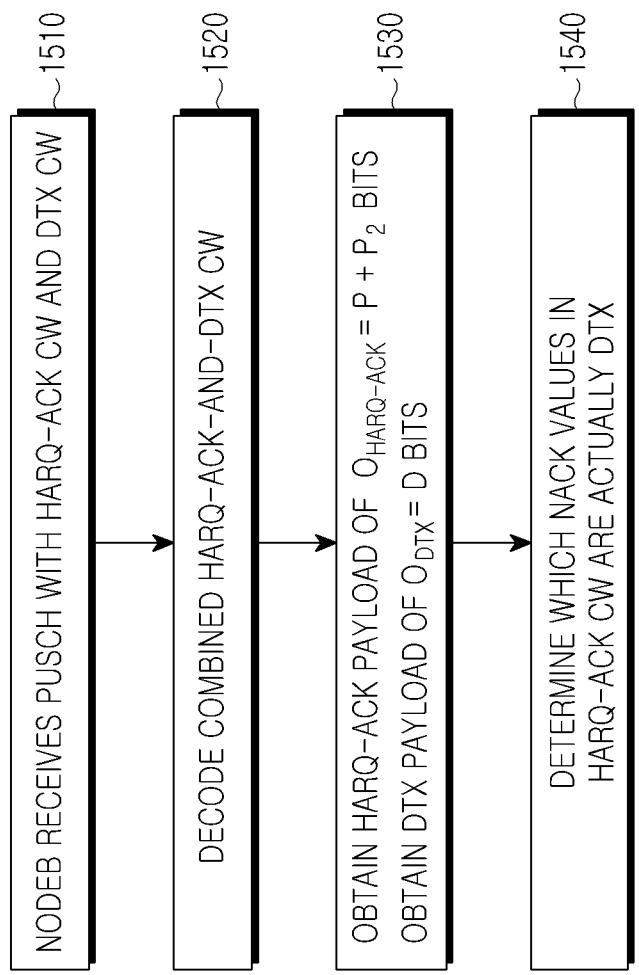
FIG. 15 is a flowchart illustrating a NodeB receiver receiving HARQ-ACK information multiplexed in a PUSCH using a Bit-Map DL DAI IE and jointly decoding a HARQ-ACK payload and a DTX payload, according to an embodiment of the present invention.

FIG. 15 is a flowchart illustrating a NodeB receiver receiving HARQ-ACK information multiplexed in a PUSCH using a Bit-Map DL DAI IE and jointly decoding a HARQ-ACK payload and a DTX payload, according to an embodiment of the present invention.

Referring to FIG. 15, in step 1510, the NodeB first receives a PUSCH including the CW and the jointly encoded HARQ-ACK and DTX payloads. After NodeB decodes that combined CW in step 1520, the NodeB can obtain the HARQ-ACK payload of $O_{HARQ-ACK}=P+P_2$ bits and the DTX payload of $O_{DTX}=D$ bits in step 1530. Based on the DTX payload, the NodeB further determines which of the NACK values of the HARQ-ACK payload actually correspond to DTX in step 1540.

For HARQ-ACK transmission in a PUCCH without DTX feedback, although the HARQ-ACK payload is $O_{HARQ-ACK}=C+C_2$ bits, the UE adjusts the PUCCH transmission power assuming the transmission of $O_{Tx\_pwr}=P+P_2$ bits. Then, in a UL subframe i, $P_{PUCCH}(i)=\min\{P_{CMAX}, h(O_{Tx\_pwr})+Q(i)\}$.

Using the Bit-Map DL DAI IE, $O_{Tx\_pwr}=P+P_2$ bits may be different, e.g., larger, than the total number of $R+R_2$ TBs the UE receives because the UE knows to include additional HARQ-ACK bits (NACK values) for TBs of PDSCHs the NodeB transmitted but that the UE did not receive. Therefore, the Bit-Map DL DAI IE enables the use of the correct HARQ-ACK signal transmission power in the PUCCH.

For HARQ-ACK transmission in a PUCCH and joint coding of the HARQ-ACK payload and the DTX payload, the UE adjusts the HARQ-ACK signal transmission power assuming a payload of $O_{Tx\_pwr}=P+P_2+D$ bits. Then, in a UL subframe i, $P_{PUCCH}(i)=\min\{P_{CMAX}, h(O_{Tx\_pwr})+Q(i)\}$.

No Cell-Domain DL DAI IE

The existence of a cell-domain DL DAI IE in DL SAs can be avoided at the cost of the UE multiplexing, in a PUSCH, the maximum possible HARQ-ACK payload of $O_{HARQ-ACK}=C+C_2$ bits. For brevity, no spatial-domain bundling is assumed in the following with the obvious modification of the HARQ-ACK payload of $O_{HARQ-ACK}=C$ bits applying when spatial-domain bundling. The number of PUSCH REs for the HARQ-ACK CW transmission is determined from the maximum HARQ-ACK payload.

If DTX (with payload $O_{DTX}=D$ bits) is supported through joint coding with the HARQ-ACK, the total payload is $O_{total}=C+C_2+D$ bits and this determines the number of PUSCH REs for multiplexing in a PUSCH the jointly coded HARQ-ACK and DTX CW.

If the HARQ-ACK payload and the DTX payload are separately coded, the HARQ-ACK payload is $O_{HARQ-ACK}=R+R_2$ bits and this determines the number of PUSCH REs for the HARQ-ACK CW multiplexing while the DTX payload is $O_{DTX}=D$ bits and this determines the number of PUSCH REs for the DTX CW multiplexing in a PUSCH.

Without the use of a cell-domain DL DAI IE, the HARQ-ACK resources required to transmit $O_{HARQ-ACK}=C+C_2$ may be larger than the ones required to transmit the $P+P_2$ HARQ-ACK bits corresponding to the TBs the NodeB transmitted to the UE. The same placement criteria applies for the REs in a PUSCH as for the Absolute Counter DL DAI IE for the joint HARQ-ACK and DTX CW (joint coding) and for the individual HARQ-ACK CW and DTX CW (separate coding).

As for the Bit-map DL DAI IE, for joint HARQ-ACK and DTX coding, DTX may be combined with HARQ-ACK in a 3-state or in a 5-state information for a total payload of $O=\lceil \log_2((C-C_2)^3+(C_2)^5-1) \rceil$ bits. The tradeoff is the implementation of Tables, at both the UE and the NodeB, mapping ACK, NACK, and DTX states to a CW of O bits versus the savings of 1-2 bits in the total payload.

For HARQ-ACK transmission in a PUCCH without DTX feedback, although the HARQ-ACK payload is $O_{HARQ-ACK}=C+C_2$ bits, the UE adjusts the HARQ-ACK signal transmission power according to $O_{Tx\_pwr}=R+R_2$ bits. Then, in UL subframe i, $P_{PUCCH}(i)=\min\{P_{CMAX}, h(O_{Tx\_pwr})+Q(i)\}$.

As previously described, adjusting the HARQ-ACK signal transmission power in the PUCCH is possible because, although $O_{HARQ-ACK}=C+C_2$ can be larger than $O_{Tx\_pwr}=R+R_2$, the NodeB receiver can utilize a-priori information regarding the value of some of the $C+C_2-R-R_2$ HARQ-ACK bits to improve the detection reliability of the HARQ-ACK CW.

As the UE does not know to include additional HARQ-ACK bits (NACK values) for TBs that the UE did not receive (if the respective DL SAs are missed), the HARQ-ACK transmission power is lower than or equal to the appropriate one as $R+R_2 \le P+P_2$. However, the increased probability of erroneous detection for the HARQ-ACK CW due to a possibly lower than necessary HARQ-ACK signal transmission power should be conditioned together with the probability the UE misses respective DL SAs. Accordingly, the overall impact on the detection reliability of the HARQ-ACK CW due to the UE transmitting the HARQ-ACK signal with a power determined based on the number of received TBs is practically negligible.

For HARQ-ACK transmission in a PUCCH and joint coding of the HARQ-ACK payload and the DTX payload, for the same reasons as previously described, the UE adjusts the HARQ-ACK signal transmission power according to $O_{Tx\_pwr}=R+R_2+D$ bits. Then, in UL subframe i, $P_{PUCCH}(i)=\min\{P_{CMAX}, h(O_{Tx\_pwr})+Q(i)\}$.

Implicit DTX

Implicit DTX feedback may be used to avoid signaling overhead of explicit DTX. The absolute minimum HARQ-ACK payload of $O_{HARQ-ACK}=R+R_2$ bits in a PUSCH can be supported.

A method for implicit DTX feedback is for a UE to select a different CS for an RS in a PUSCH to indicate the cells with no DL SAs. Assuming the existence of DL DAI and 8 CS values, the UE can indicate all possible DL SA misses for $P \le 3$, it can indicate 2 DL SAs misses for P=4, and can indicate 1 DL SA miss for P=5. Combinations for pairs of CSs for the RS in the first slot and the RS in the second slot may also be used. The same concept of using different CS values for the RS transmission to indicate DTX can be directly extended to HARQ-ACK transmission in the PUCCH.

Figure 16:
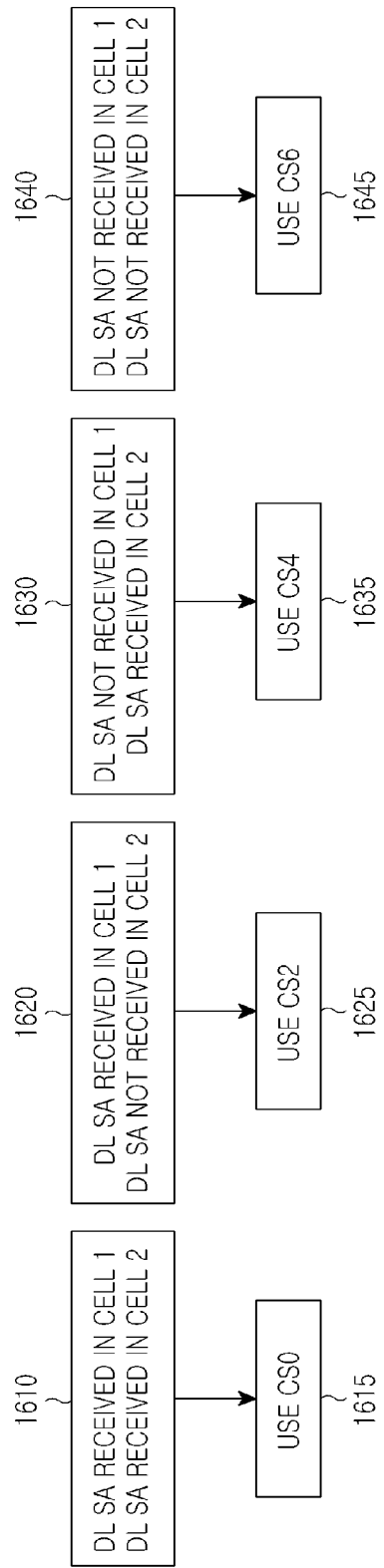
FIG. 16 is a diagram illustrating different CS values for an RS in a PUSCH to implicitly provide DTX feedback, according to an embodiment of the present invention.

FIG. 16 illustrates different CS values for an RS in a PUSCH to implicitly provide DTX feedback, according to an embodiment of the present invention.

Referring to FIG. 16, one CS value out of 8 possible values {CS0, CS1, CS2, CS3, CS4, CS5, CS6, CS7} for the RS transmission in a PUSCH, is used to indicate cells from which the UE did not receive a DL SA, assuming C=2 configured cells. The CS selection is triggered by the reception of at least one UL SA with a UL DAI IE indicating that the NodeB expects the UE to include HARQ-ACK in the PUSCH; otherwise, the UE applies the default CS value. If the UE received DL SAs in both Cell 1 and Cell 2 1610, it uses CS0 for the RS transmission in the PUSCH 1615. If the UE received a DL SA in Cell 1 but did not receive a DL SA in Cell 2 1620, it uses CS2 for the RS transmission in the PUSCH 1625. If the UE received a DL SA in Cell 2 but did not receive a DL SA in Cell 1 1630, it uses CS4 for the RS transmission in the PUSCH 1635. Finally, if the UE did not receive a DL SA in either Cell 1 or Cell 2 1640, it uses CS6 for the RS transmission in the PUSCH 1645.

The attributes of the above-described DL DAI alternatives are summarized in Table 5 below.

TABLE 5

Attributes of 4 DL DAI IE Alternatives and HARQ-ACK Transmission in PUSCH.

| | Absolute Counter DAI | FRC DAI | Bit-Map DAI | No DAI |
|---|---|---|---|---|
| DL DAI | 2 Bits | 3 Bits | 5 Bits | None |
| Payload - No DTX | N/A | $O = P$ (spatial bundling) or $O = 2P$ if $P \le C_2$ or $O = P + C_2$, if $P > C_2$ | $O = P + P_2$ | $O = C + C_2$ |
| Payload - Joint DTX | $O = 2P + D$, if $P \le C_2$ or $O = P + C_2 + D$, if $P > C_2$ | $O = 2P + D$, if $P \le C_2$ or $O = P + C_2 + D$, if $P > C_2$ | $O = P + P_2 + D$ | $O = C + C_2 + D$ |
| Payload - Separate DTX | $O = R + R_2 + D$ | $O = R + R_2 + D$ | $O = R + R_2 + D$ | $O = R + R_2 + D$ |

If a UE receives multiple DL SAs having different values for the Absolute Counter DL DAI IE or for the Bit-Map DL DAI IE, the UE may perform one of the following options:

a) Discard all DL SAs.

b) Consider as valid, the majority (or plurality), if any, of DL SAs indicating the same value for the Absolute Counter DL DAI IE or for the Bit-Map DL DAI IE, and discard the remaining DL SAs.

The same alternatives as for the DL SAs apply for the UL DAI IE, if a UE receives multiple UL SAs having different values.

Figure 17:
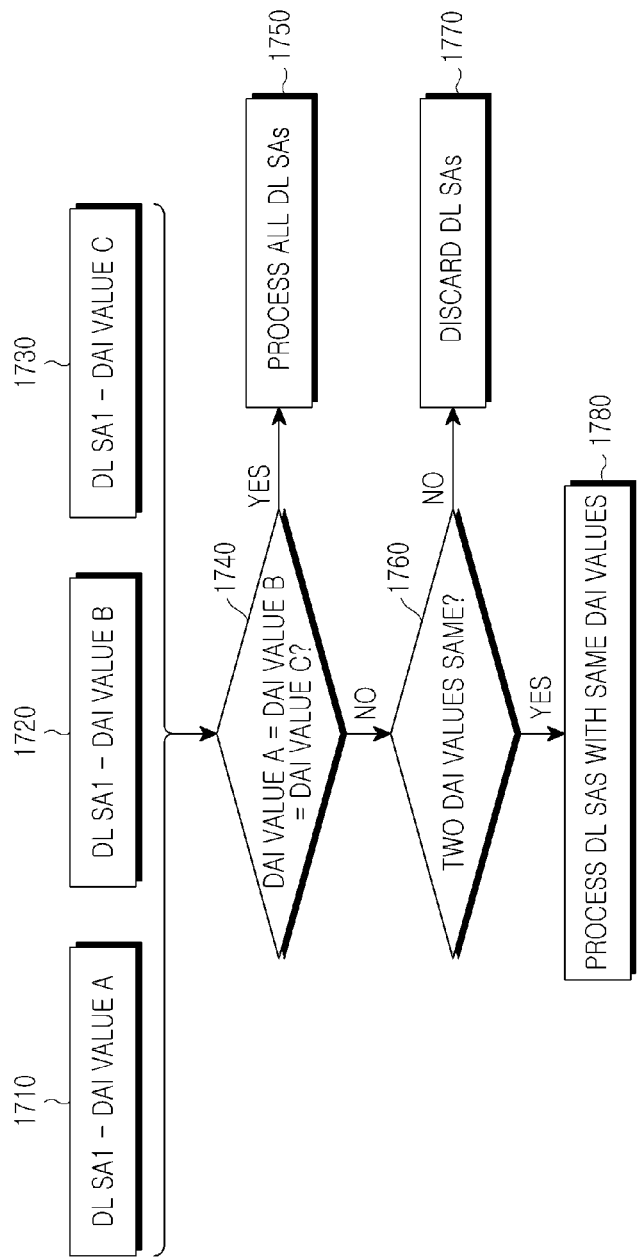
FIG. 17 is a flowchart illustrating a method of a UE to receive DL SAs having at least two different values for an Absolute Counter DL DAI IE or for a Bit-Map DL DAI IE, according to an embodiment of the present invention.

FIG. 17 is a flowchart illustrating a method of a UE to receive DL SAs having at least two different values for an Absolute Counter DL DAI IE or for a Bit-Map DL DAI IE, according to an embodiment of the present invention. Specifically, FIG. 17 illustrates the behavior of a UE when it receives multiple DL SAs having at least two different values for the Absolute Counter DL DAI IE or for the Bit-Map DL DAI IE, assuming R=3 DL SA receptions and option b), above.

Referring to FIG. 17, the UE receives a DL SA1 having DL DAI IE value A in step 1710, a DL SA2 having DL DAI IE value B in step 1720, and a DL SA3 having DL DAI IE value C in step 1730, and examines if all DL DAI IE values are the same in step 1740. If all DL DAI IE values are the same, the UE processes all of the DL SAs as valid DL SAs in step 1750. If all of the DL DAI IE values are not the same, the UE determines if 2 out of the 3 DL DAI IE values are the same in step 1760. If all of the DL DAI IE values are different, the UE discards all of the DL SAs in step 1770. If 2 values are the same in step 1760, the UE processes the DL SAs with the same DL DAI IE values and discards the DL SA with the different DL DAI IE value in step 1780.

If in a UL subframe i there is an SRS transmission in the last DFT-S-OFDM symbol and the UE is configured by the NodeB (through higher layer signaling) to support both HARQ-ACK transmission in the PUCCH and SRS transmission, the HARQ-ACK transmission in the last DFT-S-OFDM symbol of the PUCCH is suspended. As a result, the HARQ-ACK reception reliability is degraded by approximately 10 log $10(N_{symb}^{UL}/(N_{symb}^{UL}-1))$ dB. Therefore, in general, in order to compensate for the loss of L HARQ-ACK transmission symbols that may be used for SRS transmissions or for other transmissions, the PUCCH transmission power is modified as shown in Equation (4).

$$P_{PUCCH}(i) = \min\{P_{CMAX}, h(O_{Tx\_pwr}) + Q(i) + 10 \log 10(N_{symb}^{UL}/(N_{symb}^{UL} - L))\} \quad (4)$$

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for a User Equipment (UE) to transmit at least one Hybrid Automatic Repeat reQuest-ACKnowledgement (HARQ-ACK) bit, the method comprising the steps of:
   receiving at least one transport block on at least one configured cell;
   generating the at least one HARQ-ACK bit based on a number of the at least one configured cell and transmission modes for each of the at least one configured cell;
   adjusting transmission power for the at least one HARQ-ACK bit based on a number of the received at least one transport block; and
   transmitting the at least one HARQ-ACK bit,
   wherein a transmission mode supports one transport block or up to two transport blocks.

2. The method of claim 1, wherein the transmission power for the at least one HARQ-ACK bit increases based on the number of the received at least one transport block.

3. The method of claim 1, wherein the at least one HARQ-ACK bit includes one bit corresponding to one transport block which is not received for one configured cell having a transmission mode that supports up to two transport blocks.

4. The method of claim 1, wherein the UE encodes the at least one HARQ-ACK bit using a linear block code and modulates the encoded at least one HARQ-ACK bit using Quadrature Phase Shift Keying modulation.

5. The method of claim 1, wherein the at least one HARQ-ACK bit is transmitted on an uplink control channel.

6. A User Equipment (UE) apparatus for transmitting at least one Hybrid Automatic Repeat reQuest-ACKnowledgement (HARQ-ACK) bit, the apparatus comprising:
   a receiver for receiving at least one transport block on at least one configured cell;
   a generator for generating the at least one HARQ-ACK bit based on a number of the at least one configured cell and transmission modes for each of the at least one configured cell;
   a transmitter for adjusting transmission power for the at least one HARQ-ACK bit based on a number of the received at least one transport block, and transmitting the at least one HARQ-ACK bit,
   wherein a transmission mode supports one transport block or up to two transport blocks.

7. The apparatus of claim 6, wherein the transmission power for the at least one HARQ-ACK bit increases based on the number of the received at least one transport block.

8. The apparatus of claim 6, wherein the at least one HARQ-ACK bit includes one bit corresponding to one transport block which is not received for one configured cell having a transmission mode that supports up to two transport blocks.

9. The apparatus of claim 6, further comprising:
   an encoder that encodes the at least one HARQ-ACK bit using a linear block code; and
   a modulator that modulates the encoded at least one HARQ-ACK bit using Quadrature Phase Shift Keying.

10. The apparatus of claim 6, wherein the at least one HARQ-ACK bit is transmitted on an uplink control channel.

11. A method for a Node B to receive at least one Hybrid Automatic Repeat reQuest-ACKnowledgement (HARQ-ACK) bit, the method comprising the steps of:
    transmitting at least one transport block on at least one configured cell; and
    receiving the at least one HARQ-ACK bit based on a number of the at least one configured cell and transmission modes for each of the at least one configured cell,
    wherein the at least one HARQ-ACK bit is received based on a transmission power adjusted by a number of the transmitted at least one transport block, and
    wherein a transmission mode supports one transport block or up to two transport blocks.

12. The method of claim 11, wherein the transmission power for the at least one HARQ-ACK bit increases based on a number of the transmitted at least one transport block.

13. The method of claim 11, wherein the at least one HARQ-ACK bit includes one bit corresponding to one transport block which is not received for one configured cell having a transmission mode that supports up to two transport blocks.

14. The method of claim 11, wherein the UE encodes the at least one HARQ-ACK bit using a linear block code and modulates the encoded at least one HARQ-ACK bit using Quadrature Phase Shift Keying modulation.

15. The method of claim 11, wherein the at least one HARQ-ACK bit is transmitted on an uplink control channel.

16. A Node B apparatus for receiving at least one Hybrid Automatic Repeat reQuest-ACKnowledgement (HARQ-ACK) bit, the apparatus comprising:
    a transmitter for transmitting at least one transport block on at least one configured cell; and
    a receiver for receiving the at least one HARQ-ACK bit based on a number of the at least one configured cell and transmission modes for each of the at least one configured cell;
    wherein the at least one HARQ-ACK bit is received based on a transmission power adjusted by a number of the transmitted at least one transport block, and
    wherein a transmission mode supports one transport block or up to two transport blocks.

17. The apparatus of claim 16, wherein the transmission power for the at least one HARQ-ACK bit increases based on the number of the transmitted at least one transport block.

18. The apparatus of claim 16, wherein the at least one HARQ-ACK bit includes one bit corresponding to one transport block which is not received for one configured cell having a transmission mode that supports up to two transport blocks.

19. The apparatus of claim 16, wherein the UE encodes the at least one HARQ-ACK bit using a linear block code and modulates the encoded at least one HARQ-ACK bit using Quadrature Phase Shift Keying modulation.

20. The apparatus of claim 16, wherein the at least one HARQ-ACK bit is transmitted on an uplink control channel.

* * * * *